United States Patent
Sellars et al.

(10) Patent No.: US 10,793,192 B2
(45) Date of Patent: Oct. 6, 2020

(54) BRACKET NODE ASSEMBLY FOR A VEHICLE, VEHICLE FRAME ASSEMBLY HAVING SAME AND VEHICLE HAVING SAME

(71) Applicant: Honda Motor Co., Ltd., Tokyo (JP)

(72) Inventors: Daniel T. Sellars, West Liberty, OH (US); Dakota D. Kirtland, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 191 days.

(21) Appl. No.: 16/002,163

(22) Filed: Jun. 7, 2018

(65) Prior Publication Data
US 2019/0375458 A1 Dec. 12, 2019

(51) Int. Cl.
*B62D 21/11* (2006.01)
*B62D 21/18* (2006.01)

(52) U.S. Cl.
CPC ............ *B62D 21/11* (2013.01); *B62D 21/183* (2013.01)

(58) Field of Classification Search
CPC .............................. B62D 21/11; B62D 21/183
See application file for complete search history.

(56) References Cited

U.S. PATENT DOCUMENTS

| | | | | |
|---|---|---|---|---|
| 2,892,634 A * | 6/1959 | Etienne | ................... | B60K 5/00 280/124.128 |
| 2,919,139 A * | 12/1959 | Rupp, II | .............. | B62D 21/183 280/798 |
| 3,115,350 A * | 12/1963 | Quick, Jr. | ............ | B62D 21/183 280/793 |
| 3,799,283 A * | 3/1974 | Freber | ....................... | B60G 9/00 180/56 |
| 3,829,117 A * | 8/1974 | Park | ...................... | B62D 21/183 180/291 |
| 4,629,023 A * | 12/1986 | Carpanelli | ............... | B62D 1/18 180/334 |
| 6,655,717 B1 * | 12/2003 | Wang | ................... | B62D 21/183 180/311 |
| 7,650,959 B2 | 1/2010 | Kato et al. | | |
| 9,187,128 B2 * | 11/2015 | Koberstein | .............. | B62K 5/01 |
| 9,242,672 B2 * | 1/2016 | Brady | .................... | B62D 21/11 |

(Continued)

FOREIGN PATENT DOCUMENTS

| | | | | |
|---|---|---|---|---|
| CA | 2099313 A1 * | 12/1994 | ............... | B60G 3/01 |
| FR | 2144030 A6 * | 2/1973 | ............. | B60G 17/02 |
| JP | 2747668 B2 | 5/1998 | | |

*Primary Examiner* — Nicole T Verley
(74) *Attorney, Agent, or Firm* — American Honda Motor Co., Inc.; Clifford B Vaterlaus

(57) ABSTRACT

A bracket node assembly for an off-road vehicle configured with a side-by-side seating arrangement, the vehicle including at least one suspension member that supports a respective wheel of the vehicle, can include a first frame member, a second frame member, a cross member, a passenger seat, and a bracket. The first frame member can extend along a longitudinal direction of the vehicle. The second frame member can extend along a longitudinal direction of the vehicle. The cross member can extend in a transverse direction of the vehicle. The bracket can be configured to be connected to the suspension member, and the bracket can be connected to each of the first frame member, the second frame member, the cross member, and the passenger seat.

14 Claims, 14 Drawing Sheets

(56) References Cited

U.S. PATENT DOCUMENTS

| | | |
|---|---|---|
| 9,540,052 B2 | 1/2017 | Burt, II et al. |
| 9,650,078 B2 | 5/2017 | Kinsman et al. |
| 2014/0265285 A1 | 9/2014 | Erspamer |
| 2015/0061275 A1 | 3/2015 | Deckard et al. |
| 2015/0259011 A1 | 9/2015 | Deckard et al. |
| 2019/0144040 A1* | 5/2019 | Xiong .................. B62D 21/183 180/312 |
| 2019/0211915 A1* | 7/2019 | Davis .................. B62D 21/183 |

* cited by examiner

BRACKET NODE ASSEMBLY FOR A VEHICLE, VEHICLE FRAME ASSEMBLY HAVING SAME AND VEHICLE HAVING SAME

BACKGROUND

The disclosed subject matter relates to a vehicle and a bracket node assembly for the vehicle. More particularly, the disclosed subject matter relates to methods and apparatus for connecting a plurality of frame members of a vehicle frame assembly at a bracket and connecting a seat or a suspension member to the vehicle frame assembly to the bracket.

Vehicles, such as but not limited to all-terrain vehicles, can include many different suspension and wheel assemblies for each of the front end of the vehicle and the rear end of the vehicle. The suspension assembly for the front end of the vehicle can be the same as or different from the suspension assembly for the rear end of the vehicle. The difference(s) can include but are not limited to component type, component dimension, geometry, spring rate and damper rate. A common suspension member, such as a beam axle, can connect to each other and to the vehicle frame and wheels at each of the front and rear ends of the vehicle. Alternatively, each wheel can be independently connected to the vehicle frame.

Due to severity of the terrain across which an all-terrain can travel, each suspension and wheel assembly (in an all-terrain type vehicle) should allow for a relative large amount of travel of the wheel relative to the vehicle frame. This type of suspension and wheel assembly can be referred to as a long-travel suspension.

SUMMARY

Some embodiments are directed to a bracket node assembly for an off-road vehicle configured with a side-by-side seating arrangement. The vehicle can include at least one suspension member that supports a respective wheel of the vehicle. The bracket node can include a first frame member, a second frame member, a cross member, a passenger seat, and a bracket. The first frame member can extend along a longitudinal direction of the vehicle. The second frame member can extend along a longitudinal direction of the vehicle. The cross member can extend in a transverse direction of the vehicle. The bracket can be configured to be connected to the suspension member, and the bracket can be connected to each of the first frame member, the second frame member, the cross member, and the passenger seat.

Some embodiments are directed to a frame assembly for a vehicle that can include a pair of first frame members, a pair of second frame members, a cross member, a seat frame member, and a pair of brackets. The first frame members can extend along a longitudinal direction of the vehicle. The second frame members can extend along a longitudinal direction of the vehicle. The cross member can be connected to and extend from each of the first frame members in a transverse direction of the vehicle. The seat frame member can extend in the transverse direction of the vehicle. The seat frame member can be spaced away from the cross frame member. The seat frame member can be configured to mount a seating area on the frame assembly in a side-by-side seating arrangement. Each of the brackets can be connected to a respective one of the first frame members, a respective one of the second frame members, the cross member, and the seat frame member.

Some embodiments are directed to an all-terrain vehicle that can include a frame assembly, a pair of suspension members, and a pair of wheels. The frame assembly can include a main frame assembly, a front frame assembly, a rear frame assembly and a pair of brackets. The main frame assembly can define a passenger compartment and can include a pair of first frame members and a cross member. Each of the first frame members can extend along a longitudinal direction of the vehicle. The first frame members cab be spaced apart from each other in a transverse direction of the vehicle. The cross member can be connected to each of the first frame members. The cross member can extend from each of the first frame members along the transverse direction of the vehicle. The front frame assembly can be connected to a front end of the main frame assembly. The rear frame assembly can be connected to a rear end of the main frame assembly such that the main frame assembly is located between the front frame assembly and the rear frame assembly. The rear frame assembly can include a pair of second frame members spaced apart from each other in the transverse direction of the vehicle. Each of the brackets can be connected to a respective one of the first frame members, a respective one of the second frame members, and the cross member. The passenger seat can include a seat frame member and a pair of cushion assemblies. The seat frame member can be connected to each of the brackets. The seat frame member can extend in the transverse direction from each of the brackets. The seat frame member can be spaced away from the cross member in a vertical direction of the vehicle. The cushion assemblies can be connected to the seat frame member such that the cushion assemblies are spaced apart from each other in the transverse direction of the vehicle in a side-by-side configuration. Each of the first suspension members can be pivotally connected to a respective one of the brackets. Each of the rear wheels can be connected to a respective one of the suspension members.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
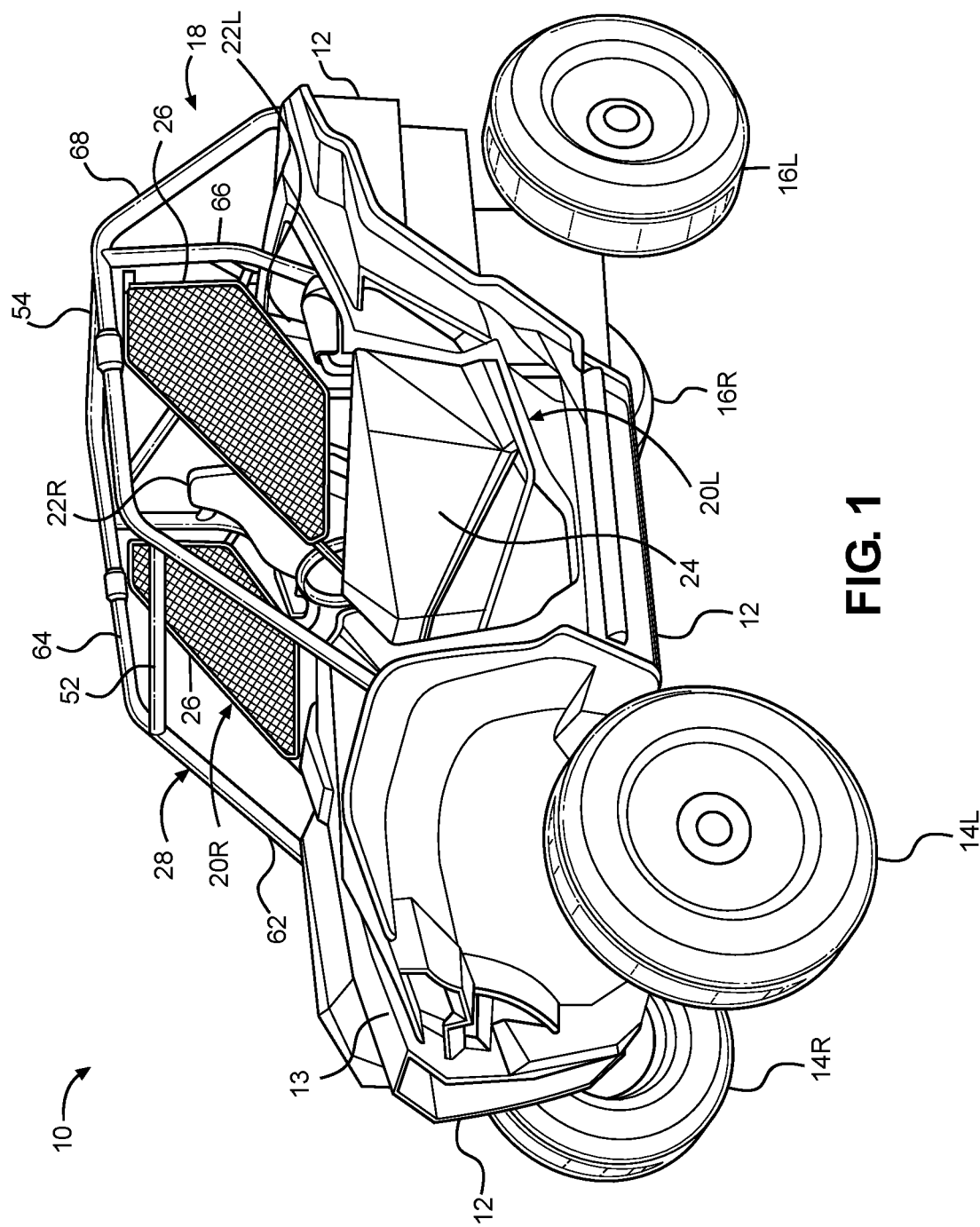
FIG. 1 is a perspective view of a vehicle made in accordance with principles of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. OVERALL VEHICLE

Various vehicle design factors may make it challenging to joining a plurality of frame members to each other, while also trying to keep the number of parts low, the assembly process simple, and the weight of the vehicle low. For example, certain frame members of the frame assembly can have different sizes and/or shapes. This difference in size/ and or shape can require one or more intervening parts that connect(s) the frame members together. The intervening part(s) can take up space that may be desired for other structure, component(s), system(s) or assembly(ies) of the vehicle; thus making assembly of the other structure, component(s), system(s) or assembly(ies) difficult, or causing the other structure, component(s), system(s) or assembly(ies) to be located at a less desirable location on the vehicle. The intervening parts also can add weight and cost to the vehicle, which can be undesirable.

Further, the suspension assembly for each wheel of an all-terrain vehicle can input relatively high loads and/or kinetic energy into the frame assembly via the mounting structure. Thus, it can be advantageous to distribute these loads to more than one frame member of the frame assembly. However, if the frame assembly requires intervening structure to connect the frame members together, the intervening structure can prevent or lessen the desired load and/or kinetic energy distribution to a plurality of frame members.

In addition to affecting the layout and connections of the frame member, various vehicle design factors may make it challenging to package a mounting structure for one or more suspension member of the suspension assembly, while also facilitating assembly of the suspension member(s) onto the frame assembly and maintenance of the suspension member(s) and the frame assembly. For example, the desired geometry and kinematics of the suspension member(s) that form the suspension assembly for each wheel and/or the desired layout of the frame members that form the frame assembly can make it difficult to distribute the loads and kinetic energy input by the suspension member to more than one frame member without intervening structure that is different from the intervening structure that may be needed for joining the frame members together. This also can increase the vehicle weight, cost, and difficulty of assembly, which results are typically undesirable.

These and other factor(s) can be taken into account in design of the frame members and the suspension assembly, while also considering a suitable location on the frame assembly where it is possible to provide an advantageous distribution of the loads and/or kinetic energy input to the frame assembly by the suspension assembly.

It may therefore be beneficial to provide a vehicle and a frame assembly for the vehicle with an apparatus that addresses at least one of the above and/or other challenges of related art vehicles. In particular, it may be beneficial to provide a frame assembly with a bracket node where a plurality of parts can be connected together and through which loads and/or kinetic energy input by the suspension assembly can be distributed to a plurality of frame members. Further, it may beneficial to provide a bracket node that does not introduce one or more intervening parts that would cause an undesired increase in weight, cost, and/or manufacturing complexity.

FIG. 1 is a perspective view of an exemplary vehicle 10 including frame assembly 18 in accordance with the disclosed subject matter. The vehicle 10 shown in FIG. 1 is specialized for use on an unimproved path or on an unmarked path, and can be referred to as an all-terrain vehicle such as a multipurpose utility vehicle (MUV) or as a side-by-side all-terrain vehicle (S×S, or S×S ATV). These all-terrain vehicles can also be referred to as off-road vehicles.

However, the disclosed vehicle frame assembly can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

Figure 2:
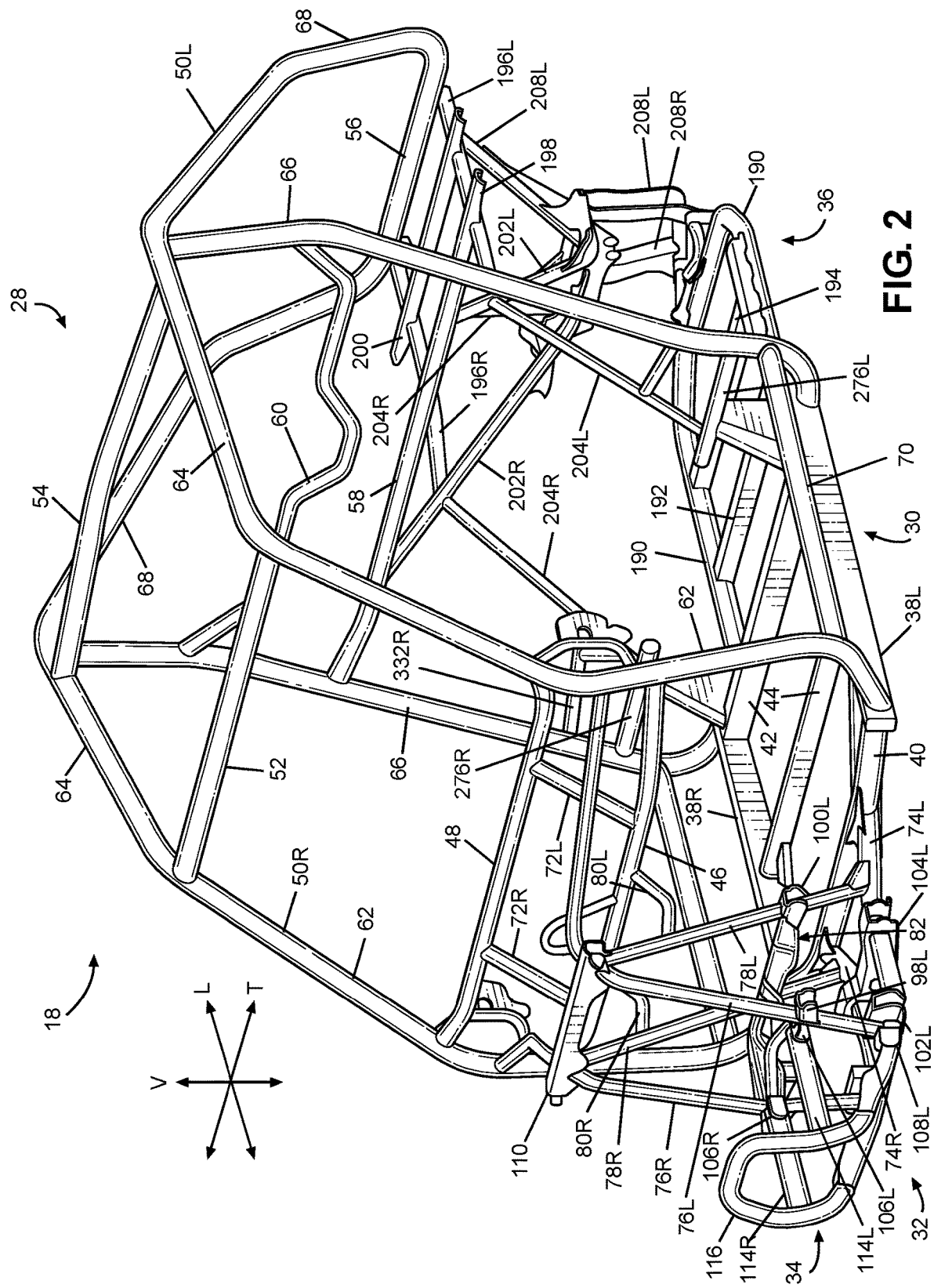
FIG. 2 is perspective front view of a frame assembly of the vehicle of FIG. 1.

The vehicle 10 can include a body 12, a pair of front wheels, 14L, 14R, a pair of rear wheels 16L, 16R, a frame assembly 18, a pair of door assemblies 20L, 20R, and a powertrain. Portions of the frame assembly 18 are hidden from view in FIG. 1 by the body 12 (but are shown in FIG. 2), and the powertrain is omitted from FIGS. 1 and 2 for simplicity and clarity of the drawings.

The vehicle 10 can include a pair of seats 22L, 22R mounted in a passenger area of the vehicle 10. The frame assembly 18 can include a roll cage 28 configured to extend around and above the seats 22L, 22R and the passenger area. The roll cage 28 can cooperate with the body 12 and/or at least a portion of the frame assembly 18 to define a pair of door openings through which a passenger may pass in order to enter or exit the passenger area.

The door assemblies 20L, 20R, which occupy the door openings, each can include a door 24 and a window panel assembly 26, and can be configured to selectively open and close access through the door openings by moving between a closed position and a fully opened position. (The door 24 of the right-side door assembly 20R is obscured from view in FIG. 1). In the closed position, the door assemblies 20L, 20R, can span the respective door openings to obstruct access to the passenger area via the door openings. In the closed position, the front portion of each door assembly 20L, 20R can be latched to the roll cage 28. The fully opened position can be any position where the door assemblies 20L, 20R are pivoted away from the respective door openings to provide substantially unobstructed access to the passenger area via the door openings. FIG. 1 shows the door assemblies 20L, 20R in the closed position.

The powertrain can include an internal combustion engine, one or more electric motor(s) or a hybrid of an internal combustion engine and one or more electric motor(s), a hydrogen engine, or other known engine/motor. The powertrain can have the engine/motor output axis oriented in the longitudinal direction L or in the traverse direction T of the vehicle 10. The powertrain can be configured to drive only the front wheels 14L, 14R, or configured to drive only the rear wheels 16L, 16R, or configured to drive all of the wheels 14L, 14R, 16L, 16R, or configured to drive the rear wheels 16L, 16R and selectively drive the front wheels 14L, 14R, or configured to drive the front wheels 14L, 14 and selectively drive the rear wheels 16L, 16R. In the exemplary embodiment of FIG. 1, the powertrain is configured as a longitudinally oriented, rear-mounted internal combustion engine that drives the rear wheels 16L, 16R and selectively drives the front wheels 14L, 14R.

II. FRAME ASSEMBLY

FIG. 2 is a perspective view of the frame assembly 18 of the vehicle 10 shown in FIG. 1, with the body 12 and all other components, assembly(ies) and system(s) removed. The frame assembly 18 can be configured to support the body 12, door assemblies 20L, 20R, passenger seats 22L, 22R, suspension components for the wheels 14L, 14R, 16L, 16R, powertrain, steering system, control pedal assemblies, passengers and cargo items. The frame assembly 18 can be configured to withstand various modes of operation, including operation on unimproved paths, and can be configured to surround the passenger area.

The frame assembly 18 can include a main frame assembly 30, a front frame assembly 32, a front bumper assembly 34 and a rear frame assembly 36.

The main frame assembly 30 can define the passenger area of the vehicle 10. The main frame assembly 30 can also provide an overall bending stiffness and torsional stiffness characteristic for the vehicle 10 that can be advantageous for rugged terrain of an unimproved path.

The front frame assembly 32 can be connected to the front end of the main frame assembly 30. The front frame assembly 32 can be configured with mounting points for the front suspension components and any appropriate components/systems, such as but not limited to portions of the body 12, a front final drive assembly, steering system components, engine cooling system, headlights, etc.

The front bumper assembly 34 can be connected to the front end of the front frame assembly 32, such that the front frame assembly 32 can be located between the front bumper assembly 34 and the main frame assembly 30. The front bumper assembly 34 can extend beyond the exterior of the body 12, or alternatively, one or more portions of the body 12 can conceal the front bumper assembly 34.

The rear frame assembly 36 can be connected to the rear end of the main frame assembly 30 such that the passenger compartment is located between the front frame assembly 32 and the rear frame assembly 36. The rear frame assembly 36 can be configured with mounting points for the rear suspension components and any appropriate components/systems, such as but not limited to portions of the body 12, a rear final drive assembly, taillights, etc.

The main frame assembly 30, front frame assembly 32, front bumper assembly 34 and rear frame assembly 36 can be made from any appropriate structural element(s), such as but not limited to tubes, beams, stampings, etc., that can provide sufficient strength and rigidity for a vehicle passenger area. The frame assembly 18 can be formed from a single type of structural element, or alternatively the frame member 18 can be formed from any combination of these structural elements. The structural elements can have any appropriate cross-sectional shape, such as but not limited to circular, rectangular, regular polygonal, irregular polygonal, hollow, solid, variable along the length of the structural element, etc.

The structural elements can be formed by any appropriate process, such as but not limited to rolling, hydroforming, bending, welding, extruding, stamping, any combination of these processes, etc. Each structural element of the frame assembly 18 can be formed from any appropriate material, such as but not limited to steel, aluminum, titanium, magnesium, plastic, fiber-reinforced plastic, carbon fiber, ceramic, a composite formed from any combination of these exemplary materials, etc. Each structural element of the frame assembly 18 can be connected to each adjoining structural element in any appropriate manner, such as but not limited to mechanical fasteners, welding, adhesive, any combination thereof, etc.

A. Main Frame Assembly

Figure 3:
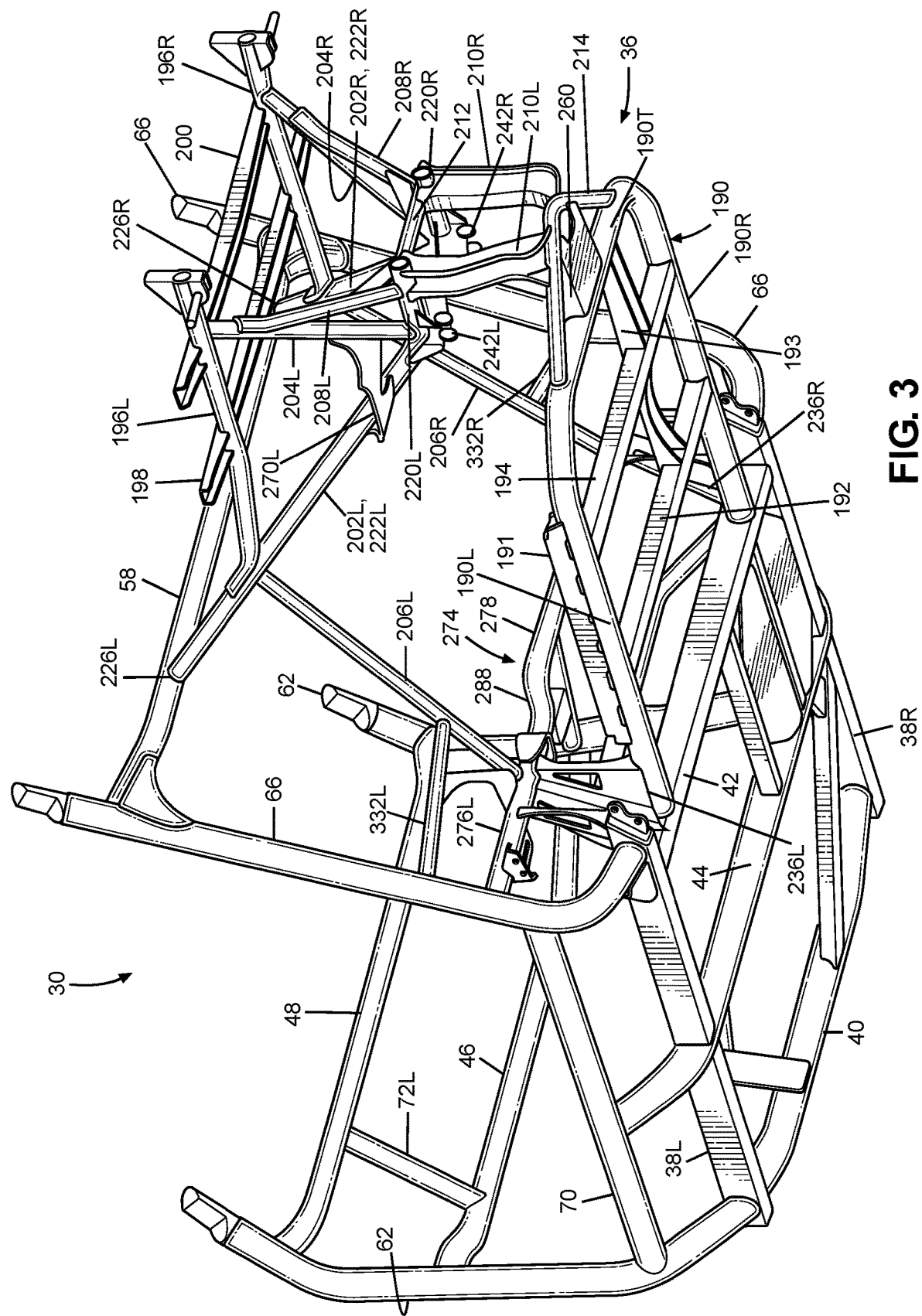
FIG. 3 is perspective rear view of a portion of the frame assembly of FIG. 2.

FIG. 3 is a perspective view of the frame assembly 18 with the upper portion of the roll cage 28 removed for simplicity and clarity of the drawing. Referring to FIGS. 2 and 3, the main frame assembly 30 can define the passenger area and can include the roll cage 28, a pair of longitudinal members 38L, 38R and a plurality of lower cross members 40, 42, 44, a pair of upper cross members 46, 48 and a pair of support members 72L, 72R.

The longitudinal members 38L, 38R can extend in the longitudinal direction L of the vehicle 10, from the front of the passenger area to the rear of the passenger area. The longitudinal members 38L, 38R can each be configured as a substantially straight, hollow beam having a substantially rectangular cross-sectional shape. The longitudinal members 38L, 38 also can be referred to as frame members.

The first through third lower cross members 40, 42, 44 can extend in the transverse direction T of the vehicle 10, from the left longitudinal member 38L to the right longitudinal member 38R. The first lower cross member 40 can be slightly bent along the longitudinal direction L near each end toward the rear of the vehicle 10. The first lower cross member 40 can be a hollow tube having a substantially circular cross-sectional shape. The second and third lower cross members 42, 44 can be configured as a substantially straight, hollow beam having a substantially rectangular cross-sectional shape.

The first lower cross member 40 can be connected to each of the longitudinal members 38L, 38R adjacent a respective front end of the longitudinal members 38L, 38R. The second lower cross member 42 can be connected to each of the longitudinal members 38L, 38R adjacent a respective rear end of the longitudinal members 38L, 38R. The third lower cross member 44 can be connected to each of the longitudinal members 38L, 38R at a portion of the longitudinal members 38L, 38R intermediate the front and rear ends of the respective longitudinal members 38L, 38R. In the exemplary embodiment of FIG. 2, welds can connect the lower cross members 40, 42, 44 to the longitudinal members 38L, 38R.

The first and second upper cross members 46, 48 can extend in the transverse direction T of the vehicle 10 from the left cage side assembly 50L to the right cage side assembly 50R. The first upper cross member 46 can be spaced away from the second upper cross member 48. The second upper cross member 48 can be connected to the cage side assemblies 50L, 50R at a position that is higher in the vertical direction V of the vehicle 10 than the position at which the first upper cross member 46 is connected to the side assemblies 50L, 50R.

The support members 72L, 72R can extend generally in the vertical direction V of the vehicle 10 from the first upper cross member 46 to the second upper cross member 48. The support member 72L, 72R can be spaced apart from each other in the transverse direction T of the vehicle 10. The support members 72L, 72R can each be configured as a hollow tube having a substantially circular cross-sectional shape. In the exemplary embodiment of FIG. 2, welds can connect the support members 72L, 72R to the upper cross members 46, 48.

The upper cross members 46, 48 and the support members 72L, 72R can be configured to support and secure a panel assembly (such as but not limited to an instrument panel assembly), a steering assembly, and/or a portion of the body 12 (such as but not limited to a hood panel 13—see FIG. 1).

The roll cage 28 can include a pair of cage side assemblies 50L, 50R, a plurality of cage cross members 52, 54, 56, 58, 60. The roll cage 28 generally defines the passenger compartment.

The cage side assemblies 50L, 50R can extend in the longitudinal direction L of the vehicle 10, from the front end of the passenger area to the rear end of the passenger area. The cage side assemblies 50L, 50R can define the limits of the passenger area in the transverse direction T of the vehicle 10, the longitudinal direction L of the vehicle 10 and in the vertical direction V of the vehicle 10. The cage side assemblies 50L, 50R can be configured to support the door assemblies 20L, 20R and any appropriate portion(s) of the body 12, such as but not limited to flexible side panel(s) (transparent, opaque, or a combination thereof), rigid side panel(s), roof panel (rigid or flexible), flexible or rigid rear panel (transparent, opaque, or a combination thereof), etc. The cage side assemblies 50L, 50R can be configured to resist, impede, or minimize deformation that could be caused by a load or kinetic energy input into either or both of the cage side assemblies.

Each of the cage side assemblies 50L, 50R can be formed from any appropriate number of structural elements, from one to any number greater than one. The side cage assemblies 50L, 50R can be configured with any shape and contour that can be advantageous to meet the structural performance and aesthetic appeal desired for the vehicle 10. The following description will be directed toward the left cage side assembly 50L with the understanding that the right cage side assembly 50R can be a mirror image of the left cage side assembly 50L.

The left cage side assembly 50L can include a plurality of cage side members 62, 64, 66, 68, 70. Each of the first through fifth cage side members 62, 64, 66, 68, 70 can be configured as a hollow tube having a substantially circular cross-section shape. The cage side members 62, 64, 66, 68, 70 can be configured with any appropriate elongated shape that can provide the desired dimensionality of the passenger area and advantageously conform to the aesthetic appearance desired for the vehicle 10.

The first cage side member 62 can be referred to as an A-pillar. The first cage side member 62 can be connected at one end to the left longitudinal member 38L adjacent the front end of the left longitudinal member 38L. The first cage side member 62 can be connected to a side of the left longitudinal member 38L that can be opposite to the side to which the first cross member 40 is connected. The one end of the first cage side member 62 can be aligned in the transverse direction T with the end of the first cross member 40 that is connected to the left longitudinal member 38L.

Each of the upper cross members 46, 48 can be connected to a middle portion of the first cage side member 62 of each of the cage side assemblies 50L, 50R.

The third cage side member 66 can be referred to as a B-pillar. The third cage side member 66 can be connected at one end to the left longitudinal member 38L adjacent the rear end of the left longitudinal member 38L. The third cage side member 66 can be connected to a side of the left longitudinal member 38L that can be opposite to the side to which the second lower cross member 42 is connected. The one end of the third cage side member 66 can be aligned in the transverse direction T with the end of the second cross member 42 that is connected to the left longitudinal member 38L.

The first through fifth cage cross members 52, 54, 56, 58, 60 can extend in the transverse direction T of the vehicle 10 from the left side assembly 50L to the right side assembly 50R. The cage cross members 52, 54, 56, 58, 60 can be connected to each of the side assemblies 50L, 50R at respective locations spaced apart along the longitudinal direction L of the vehicle 10. The cage cross members 52, 54, 56, 58, 60 can be configured to maintain a predetermined spacing between the left cage side assembly 50L and the right cage side assembly 50R in the transverse direction T. The cage cross members 52, 54, 56, 58, 60 can define the limits of the passenger area in the longitudinal direction L of the vehicle 10 and the vertical direction V of the vehicle 10. The cage cross members 52, 54, 56, 58, 60 can be configured to manage load and/or energy inputs so that deflection of the frame assembly 18 in the vicinity of the passenger area can be controlled in an advantageous predetermined manner. In the exemplary embodiment of FIG. 2, the cage cross members 52, 54, 56, 58, 60 can be connected to the cage side assemblies 50L, 50R by welding.

B. Front Frame Assembly

Referring to FIG. 2, the front frame assembly 32 can be connected to the first lower cross member 40 and each of the first cage side members 62 of the main frame assembly 30. The front frame assembly 32 can include the front bumper assembly 34, a pair of front lower members 74L, 74R, a pair of first front members 76L, 76R, a pair of second front members 78L, 78R, a pair of intermediate members 80L, 80R and a transverse frame assembly 82.

The front frame members 76L, 76R, 78L, 78R can be spaced apart from each other in the transverse direction T of the vehicle 10 by a predetermined distance sufficient to accommodate any component(s) and/or system(s) to be supported by the front frame assembly 32. The front frame assembly 32 can be configured to support a front suspension and wheel assembly, and other components such as but not limited to a radiator, a steering rack assembly and a front final drive assembly. The front suspension and wheel assembly can include, at least one suspension member on each side of the front frame assembly 32, a damper and spring assembly on each side of the front frame assembly 32, a front hub assembly on each side of the front frame assembly 32, and the front wheels 14L, 14R.

In the exemplary embodiment of FIG. 2, each of the front lower frame members 74L, 74R, the first front frame members 76L, 76R, the second front frame members 78L, 78R are configured as hollow metal tubes having a substantially circular cross-section. However, any combination of the front lower frame members 74L, 74R, the first front frame members 76L, 76R and the second front frame members 78L, 78R can be have a cross-sectional shape that is different from a substantially circular cross-sectional shape. Further, any combination of the front lower frame members 74L, 74R, the first front frame members 76L, 76R and the second front frame members 78L, 78R can be formed of a material other than metal, such as but not limited to carbon fiber, plastic, carbon fiber reinforced plastic, ceramic, pulp, or glass fiber reinforced plastic.

Further, the front lower frame members 74L, 74R, the first front frame members 76L, 76R, the second front frame members 78L, 78R can be welded to each other to form the structure described above. However, embodiments are intended to include or otherwise cover any combination of the front lower frame members 74L, 74R, the first front frame members 76L, 76R and the second front frame members 78L, 78R connected by threaded fasteners, adhesives, a combination of brackets and threaded fasteners, rivets, or other known connective structures, materials, or methods.

C. Front Bumper Assembly

The front frame assembly 32 can include the front bumper assembly 34. Referring to FIG. 2, the front bumper assembly 34 can be connected to the front side of the first frame members 76L, 76R, such that the first and second frame members 76L, 76R, 78L, 78R are located between or intermediate the front bumper assembly 34 and the main frame assembly 30.

The front bumper assembly 34 can be configured to deform in a predetermined and controlled manner in response to load or kinetic energy input to the front bumper assembly 34 that exceeds a predetermined threshold.

D. Rear Frame Assembly

Referring to FIGS. 2 and 3, the rear frame assembly 36 can include rear lower frame member 190, a first lower cross frame member 192, a second lower cross frame member 194, a pair of bed frame members 196L, 196R, a first bed cross member 198, a second bed cross member 200, a pair of first rear frame members 202L, 202R, a pair of second rear frame members 204L, 204R, a pair of third rear frame members 206L, 206R, a pair of fourth rear frame members 208L, 208R, a pair of rear connecting frame members 210L, 210R, a rear cross frame member 212 and rear extension frame member 214. The first rear frame members 202L, 202R and the second rear frame members can be referred to a first upper frame members and second upper frame members, respectively.

The rear lower frame member 190 can be connected to and can extend away from the main frame assembly 30 in the longitudinal direction L of the vehicle 10. The rear lower frame member 190 can have two side portions 190L, 190R and a cross portion 190T arranged in generally U-shaped configuration such that the cross portion 190T extends between the side portions 190L 190R. The side portions 190L, 190R also can be referred to as frame members.

The side portions 190L, 190R can extend along the longitudinal direction L of the vehicle 10. The side portions 190L, 190R can be spaced apart in the transverse direction T of the vehicle 10. Each of the side portions 190L, 190R can be connected to the second lower cross member 42 at positions spaced inboard of the longitudinal members 38L, 38R in the transverse direction T of the vehicle 10. The side portions 190L 190R can be connected to the second lower cross member 42 in any appropriate manner such as but not limited to welding, adhesives, mechanical fasteners, etc. The side portions 190L, 190R can be referred to as first lower frame members.

The cross portion 190T can extend along the transverse direction T of the vehicle 10. The cross portion 190T can extend from each of the side portions 190L, 190R. In the exemplary embodiment of FIGS. 2-9, the cross portion 190T can have an angled portion at each end that transitions into the side portions 190L, 190R along short bends. The cross portion 190T can be referred to as a second lower frame member.

Alternatively, each of the side portions 190L, 190R can include a respective angled portion that transitions into the cross portion 190T along a short bend. In another alternate embodiment, the angled portions can be omitted such that cross portion 190T transitions directly into each of the side portions 190L, 190R along a right angled or other short bend.

As shown in the exemplary embodiment of FIG. 2, the lower frame member 190 can be a single homogenous piece formed by bending a hollow pipe. In accordance with the disclosed subject matter, the lower frame member 190 can be formed from a plurality of sections that are subsequently fastened together in any appropriate manner such as but not limited to welding, adhesives, mechanical fasteners, etc. The individual sections can be formed in the desired shape by any appropriate process such as but not limited to pipe bending, casting, forging, hydroforming, etc.

The first and second lower cross frame members 192, 194 can be connected to and/or form the rear lower frame member 190 at respective locations that are spaced apart in the longitudinal direction L of the vehicle 10. The first and second lower cross frame members 192, 194 can extend in the transverse direction T of the vehicle 10 from each of the side portions 190L, 190R. The first cross frame member 192 can be located between the second lower cross member 42 and the second lower cross frame member 194.

The rear lower frame member 190 and the lower cross frame members 192, 194 can be configured to support a powertrain assembly. An exemplary powertrain can include power source, a transmission and a final drive structure. The power source can be any appropriate power source such as but not limited to an internal combustion engine (having a single cylinder or a plurality of cylinders), an electric motor, or a hybrid system that includes an internal combustion engine and an electric motor. A transmission can be connected to and between each of the power source 218 and the final drive structure 216. The transmission can include various types of transmissions including a stepped speed ratio assembly or a continuously variable speed ratio assembly. The transmission can be configured as an automatic transmission, a manual transmission, or a semi-automatic transmission. As will be discussed in detail below, the power source 218 and the transmission can be connected to the rear lower frame member 190 in any appropriate manner such as but not limited to brackets and mechanical fasteners, welds, rivets, rubber mounting assembly(ies), fluid filled mounting assembly(ies), or any combination thereof.

In the exemplary embodiment shown in FIG. 3, the power source and the transmission can be mounted on a left rail 191 and a right rail 193. The left rail 191 can be mounted to the left side portion 190L of the rear lower frame member 190. The right rail can be mounted to each of first lower cross member 192, the second lower cross member 194 and the cross portion 190T of the rear lower frame member 190. The right rail 193 can be spaced inward away from the right side portion 190R in the transverse direction T of the vehicle 10. One or more engine mounts can be connected between the power source and each of the rails 191, 193. The transmission can be connected to one or both of the rails 191, 193 by one or more mounting assemblies. However, in accordance with other embodiments of the disclosed subject matter, the transmission can be connected to the power source and/or the final drive structure such that the power source and/or the final drive structure supports the transmission.

Referring to FIGS. 2 and 3, the bed frame members 196L, 196R and the first and second cross frame members 198, 200 can form a bed frame assembly of the vehicle 10. The body 12 can include a cargo or storage area that is mounted on the bed frame assembly. The first rear frame members 202L, 202R, the second rear frame members 204L, 204R, and the fourth rear frame members 208L, 208R can support the bed frame assembly.

Each of the bed frame members 196L, 196R can be connected to and can extend from a respective one of the first rear frame members 202L, 202R and a respective one of the second rear frame members 204L, 204R. Each of the bed frame members 196L, 196R can extend from the respective one of the first rear frame members 202L, 202R in the longitudinal direction L of the vehicle 10. The bed frame members 196L, 196R can be spaced apart in the transverse direction T of the vehicle.

The first and second bed cross members 198, 200 can be connected to and can extend from each of the bed frame members 196L, 196R in the transverse direction T of the vehicle 10. The first and second bed cross members 198, 200 can be spaced apart from each other in the longitudinal direction L of the vehicle 10.

The first rear frame members 202L, 202R can be configured to support a load input by the final drive structure and transfer at least a portion of the load to the main frame assembly 30. The first rear frame members 202L, 202R can be directly connected to the main frame assembly 30 and the final drive structure. For example, the first rear frame members 202L, 202R can be connected to the fourth cage cross member 58 in any appropriate manner such as but not limited to welding, adhesives, mechanical fasteners, etc. The connection between the first rear frame members 202L, 202R and the final drive structure 216 will be discussed in further detail below.

Referring to FIGS. 2 and 3, each of the second rear frame members 204L, 204R can be connected to a respective one of the first rear frame members 202L, 202R and can extend upwardly away from the respective one of the first rear frame members 202L, 202R along the vertical direction V of the vehicle 10. Each of the second rear frame members 204L, 204R can extend along each of the longitudinal direction L, the transverse direction T and the vertical direction V of the vehicle 10 from a respective one of the first rear frame members 202L, 202R to a respective one of the bed frame members 196L, 196R.

Referring to FIGS. 2 and 3, each of the third rear frame members 206L, 206R can be connected to and can extend from the main frame assembly 30 and a respective one of the first rear frame members 202L, 202R. Each of the third rear frame members 206L, 206R can extend along each of the longitudinal direction L, the transverse direction T and the vertical direction V of the vehicle 10. Each of the third rear frame members 206L, 206R can be connected to a respective one of the first rear frame members 202L, 202R.

Each of the fourth rear frame members 208L, 208R can be connected to and extend from a respective one of the first rear frame members 202L, 202R and a respective one of the second frame members 204L, 204R. Each of the fourth rear frame members 208L, 208R can along each of the longitudinal direction L, the transverse direction T and the vertical direction V of the vehicle 10.

The lower frame member 190 can include an extension frame member 214. The extension frame member 214 can be connected to and can extend away from the cross portion 190T of the lower frame member 190. The extension frame member 214 can have a general V-shape with the base of the general V-shaped facing away from the cross portion 190T in the longitudinal direction L of the vehicle 10.

Each of the rear connecting frame members 210L, 210R can be connected to and extend from the rear lower frame member 190 and a respective one of the first rear frame members 202L, 202R. For example, each of the rear connecting frame members 210L, 210R can be connected to the extension frame member 214 and a respective one of the first portions 220L, 220R of the first rear frame members 202L, 202R.

The rear cross frame member 212 can be connected to and can extend from each of the first rear frame members 202L, 202R in the transverse direction T of the vehicle 10. The rear cross frame member 212 can be connected to each of the first portions 220L, 220R of the first rear frame members 202L, 202R. Each of the rear connecting frame members 210L, 210R can be connected to the rear cross frame member 212.

III. PASSENGER SEAT

The vehicle 10 can include a passenger seat that provides a seating area for one or more passengers and a mounting structure that secures the seating area to the frame assembly 18. The seating area can be configured in a side-by-side arrangement such that at least a pair of passengers can be seated next to each other along the transverse direction T of the vehicle 10. For example, the side-by-side seating area can be configured as a continuous seating area that can accommodate one or more passengers, such as but not limited to a bench seat that includes a seat bottom that extends across the passenger compartment of the main frame assembly 30.

Figure 4:
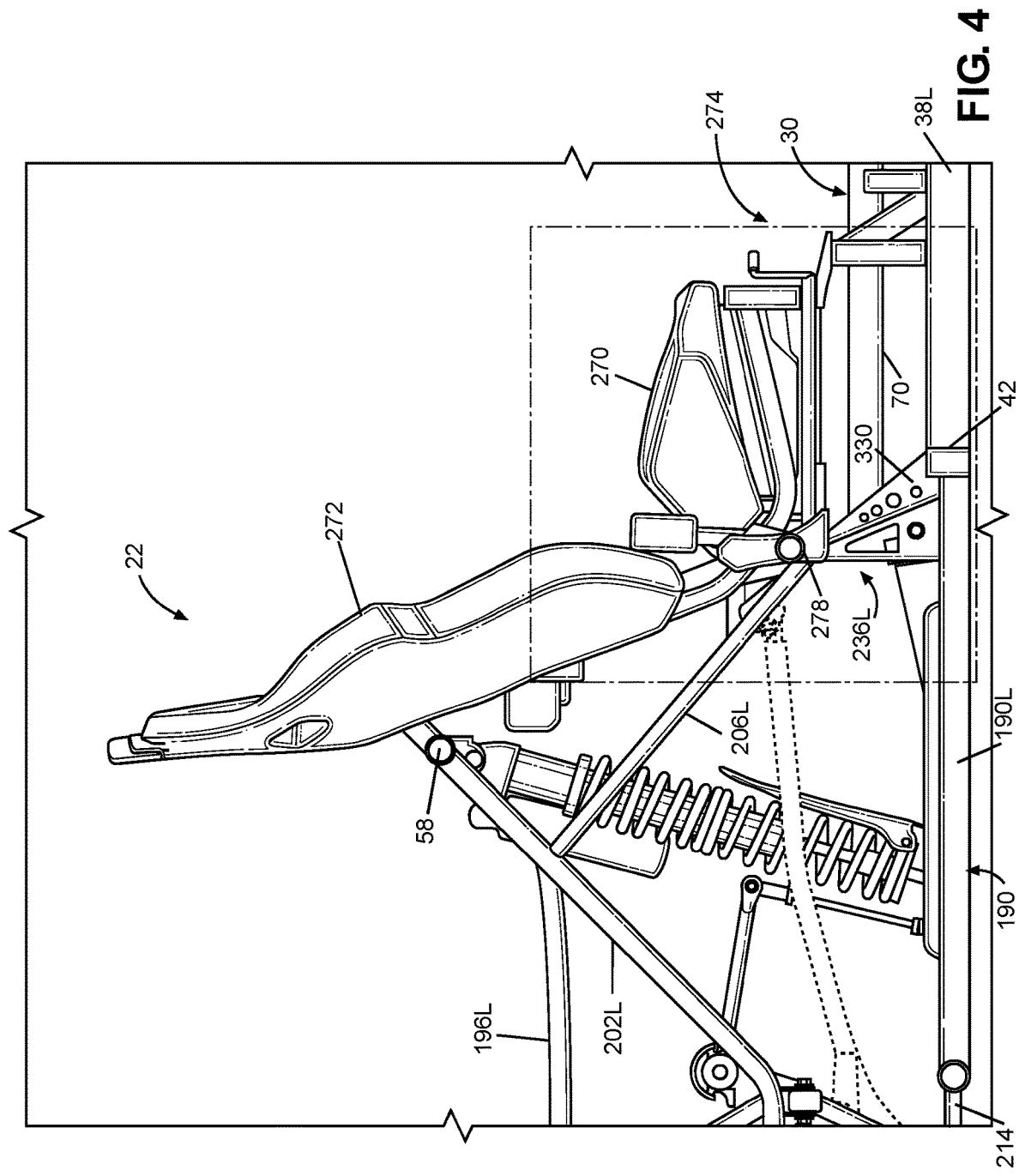
FIG. 4 is a side view of a left side of a passenger seat and a portion of the left side of the frame assembly of the vehicle of FIG. 1.
Figure 5:
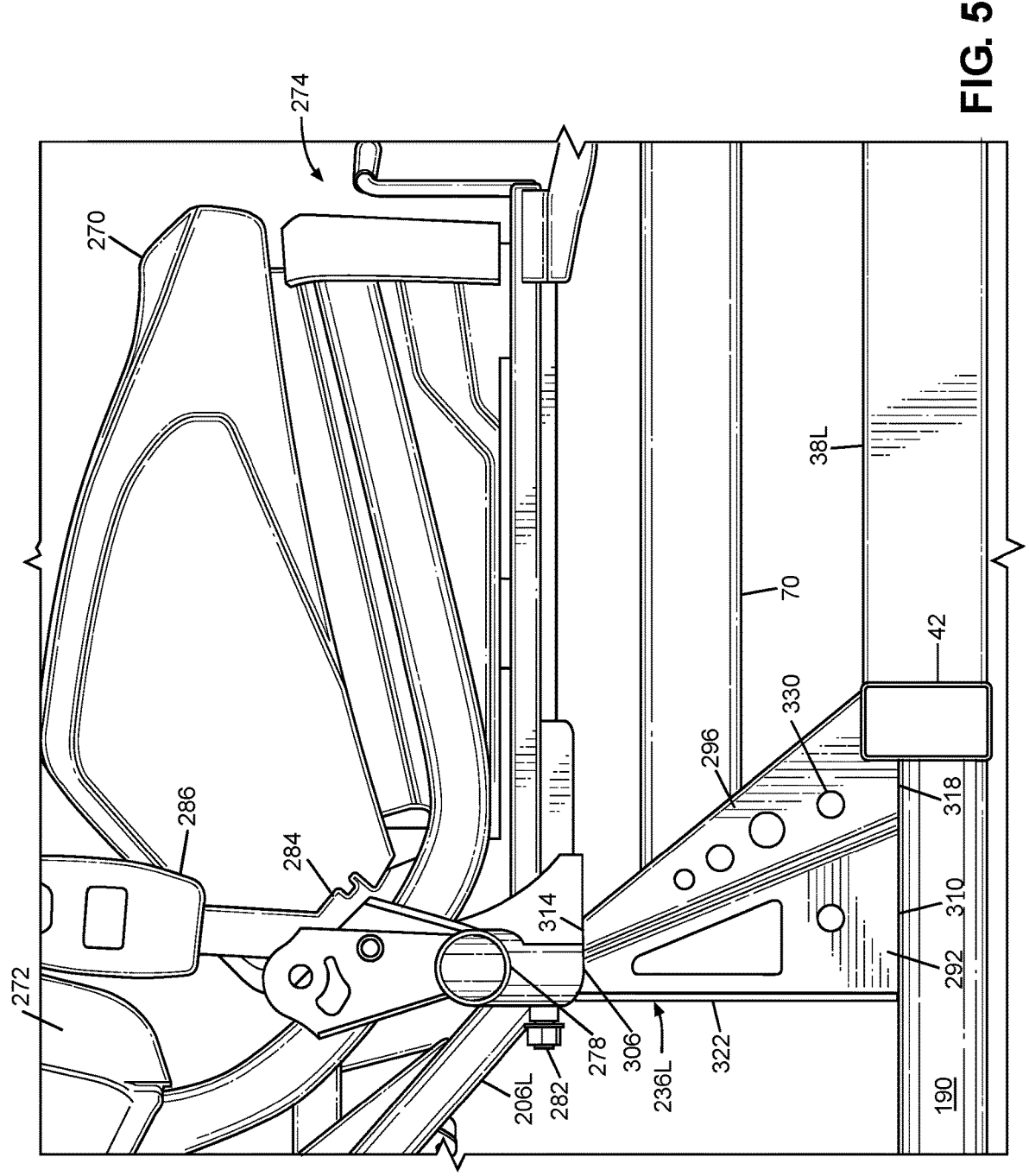
FIG. 5 is an enlarged view of a portion of FIG. 4.

Alternatively, as depicted in the exemplary embodiment of FIGS. 1, 4 and 5, the vehicle 10 can include the pair of passenger seats 22L, 22R, which provide a seating area that is configured into a side-by-side arrangement such that the passenger seats 22L, 22R are aligned along and spaced away from each other in the transverse direction T of the vehicle 10.

FIG. 4 is a side view of the left-side of the frame assembly 18 of FIG. 2 taken along a cross-sectional plane that includes a central axis of the frame assembly 18 that extends in the longitudinal axis L. FIG. 5 is an enlarged portion of FIG. 4. FIGS. 4 and 5 show the left-side seat 22L attached to the frame assembly 18, with portions of the main frame assembly 30 omitted for clarity and simplicity of the drawings.

The following description is directed toward the left-side passenger seat 22L with the understanding that the right-side seat 22R can be identical to or a mirror image of the left-side seat 22L. Each of the seats 22L, 22R can include a seat bottom 270, a seat back 272 and a seat frame 274. Each of the seat bottom 270 and the seat back 272 can be connected to the seat frame 274. The seat bottom 270 and the seat back collectively can be referred to as a cushion assembly. That is, the exemplary embodiment of FIGS. 1-14 can include a pair of cushion assemblies that are attached to the seat frame. As discussed in the next section, the seat frame 274 can be connected to the frame assembly 18.

In the exemplary embodiment of FIGS. 1-14, the seat bottom 270 and the seat back 272 can be separate and distinct structures. Alternatively, the seat bottom 270 and the seat back 272 can be integrated into a continuous, one-piece structure.

The seat frame 274 can include one or more frame members such that the seat frame 274 can be connected to the frame assembly 18 and can sufficiently support the seat 22L and the occupying passenger on the frame assembly 18. Further, the seat frame 274 can permit the position of the seat bottom 270 and the position of the seat back 272 to be adjusted along the longitudinal direction L of the vehicle 10.

In the exemplary embodiment of FIGS. 4-8, the seat frame 274 includes a pair of outer seat frame members 276L, 276R and a central seat frame member 278. Each of the outer seat members can be connected to and can extend away from a respective one of the third cage side members 66 along the transverse direction T of the vehicle 10. The central seat frame member 278 can be connected to and can extend from each of the outer seat frame members 276L, 276R.

Figure 6:
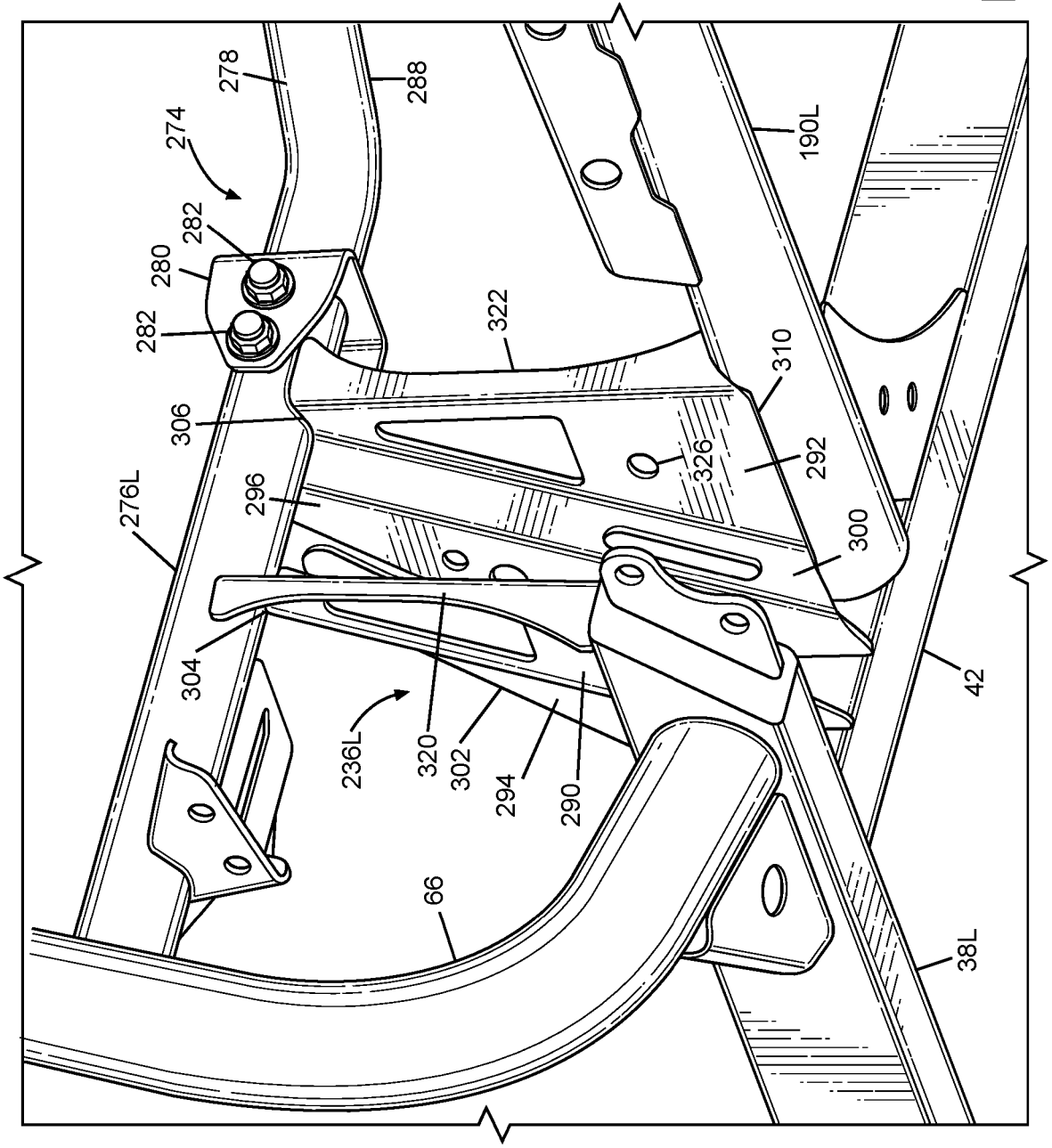
FIG. 6 is a perspective lower rear view of a bracket node and a portion of the frame assembly of FIG. 2.
Figure 7:
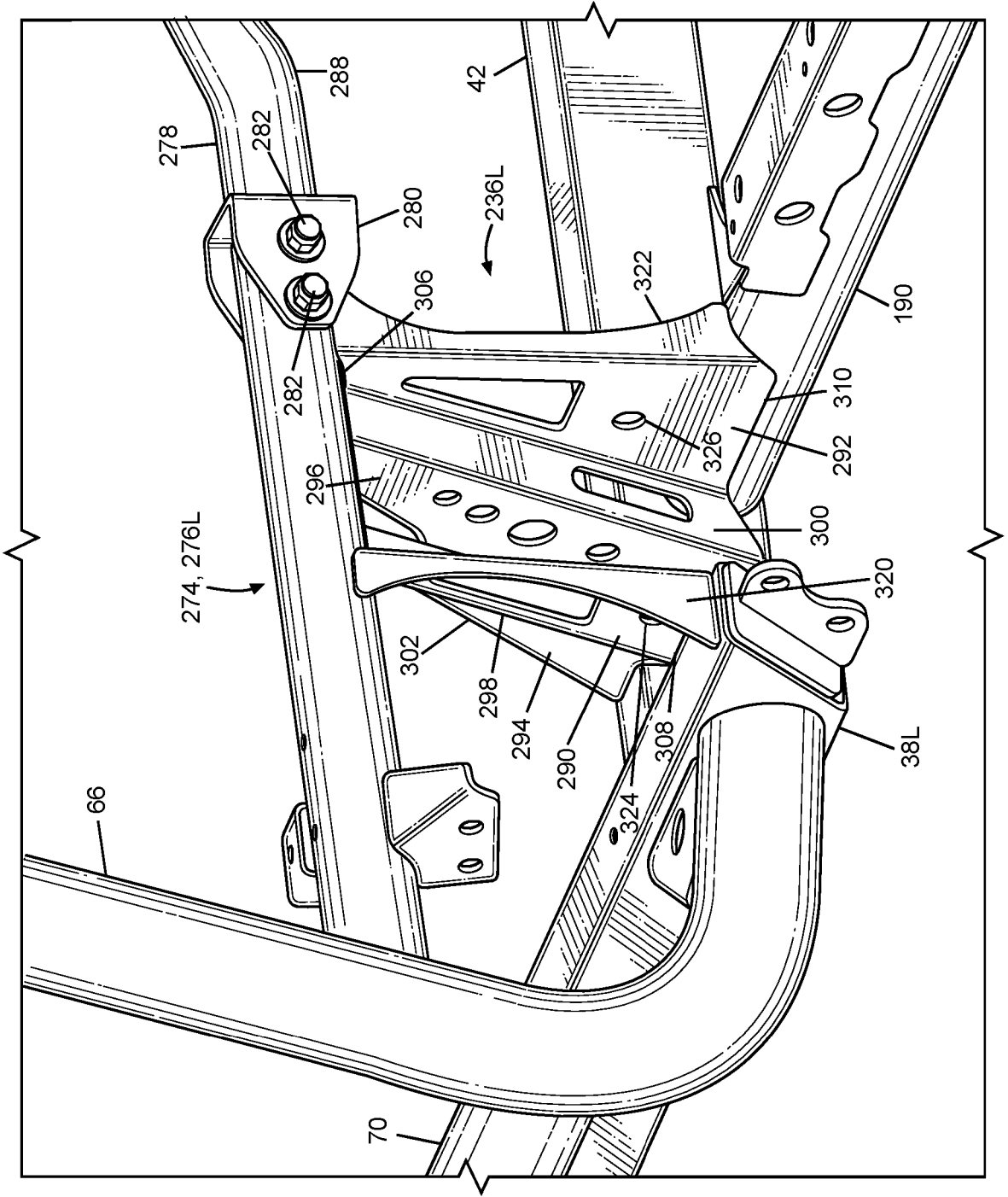
FIG. 7 is a perspective upper rear view of a bracket node and a portion of the frame assembly of FIG. 2.

The central seat frame member 278 can extend along the transverse direction T of the vehicle 10. Referring to FIGS. 3, 6 and 7, the central seat frame member 278 can include a bent section 288 adjacent to each end of the central seat frame member that extends upwardly along the vertical direction V of the vehicle 10 and along the transverse direction T of the vehicle 10 such that a middle portion of the central seat frame member 278 is elevated above the ends along the vertical direction V of the vehicle 10. (Only the left-side bent section 288 is shown—the right-side bent portion 288 is obstructed from view in FIG. 3, and FIGS. 6 and 7 show only a portion of the left-side of the frame assembly 18.)

Figure 8:
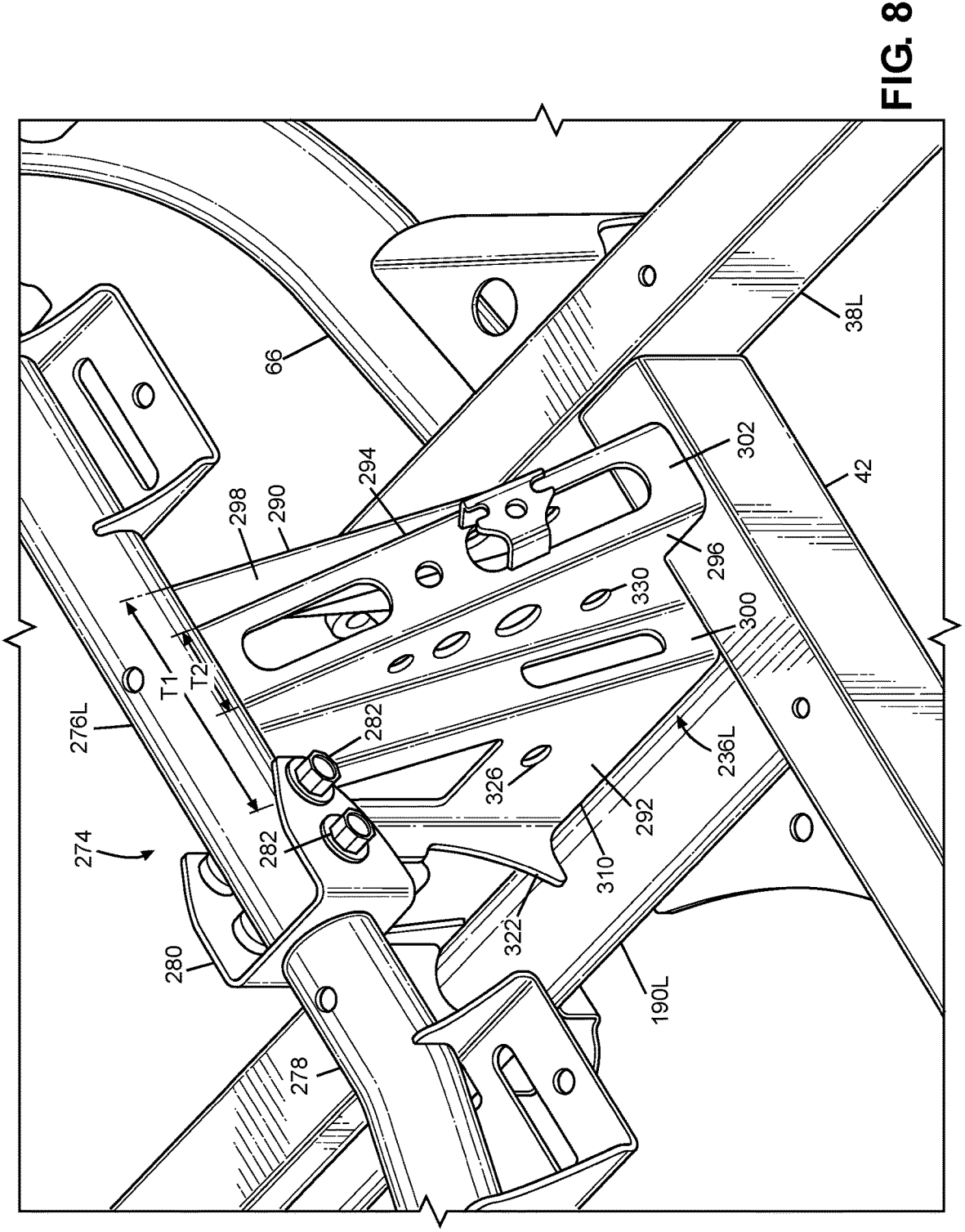
FIG. 8 is a perspective front view of a bracket node and a portion of the frame assembly of FIG. 2.

The seats 22L, 22R can be mounted to the central seat frame member 278 to form a sub-assembly. Referring to FIGS. 4 and 5, the sub-assembly can include other components such as but not limited to a seat belt anchor 284 for a seat belt buckle 286 for each seat. The sub-assembly can be mounted on the vehicle by connecting the ends of the central seat frame member 278 to each of the outer seat frame members 276L, 276R. Referring to FIGS. 6-8, a bracket 280 and fasteners 282 can connect each end of the central seat frame member 278 to a respective one of the outer seat frame members 276L, 276R. The brackets 280 can be secured to the ends of the central seat frame member 278 in any appropriate member such as but not limited to welding, adhesive, mechanical fasteners. Alternatively, the brackets 280 can be integrally formed with the central seat frame member 278. Each of the brackets 280 and each of the outer seat frame members 276L, 276R can include a pair of mounting holes. Each of the fasteners 282 can pass through a respective one of the mounting holes. Thus, the sub-assembly can facilitate mounting the seats 22L, 22R onto the vehicle 10.

IV. BRACKET NODES

The frame assembly 18 can include a pair of bracket nodes. Each of the bracket nodes can be configured to integrate the rear lower frame member 190, the second lower cross member 42, a respective one of the longitudinal members 38L, 38R, and a respective one of the passenger seats 22L, 22R. In addition to integrating the frame members 38L (or 38R), 42, 190 and the passenger seat 22L (or 22R) at a common node, the bracket node can also distribute loads and kinetic energy input by the passenger(s) via the passenger seat 22L (22R) to multiple portions of the frame assembly 18 without requiring any intervening structure. As discussed in further detail below, each of the bracket nodes also can include at least one mounting structure that is configured to mount a suspension member of the rear suspension and wheel assembly. Thus, in addition to integrating the frame members 38L (or 38R, 42, 190 and the passenger seat 22L (or 22R) at a common node, the bracket node can also distribute loads and kinetic energy input by the rear suspension and wheel assembly to multiple portions of the frame assembly 18 without requiring any intervening structure. Thus, the weight and complexity of the frame assembly 18 can be kept relatively low.

A. Bracket Structure

In the exemplary embodiment of FIGS. 1-14, each of the bracket nodes can include a respective one of a pair of brackets 236L, 236R. Referring to FIGS. 2-14, the left-side bracket 236L can be connected to each of the left-side longitudinal member 38L, the left side portion 190L of the rear lower frame member 190, the left-side outer seat frame member 276L and the second lower cross member 42. Referring to FIGS. 2 and 3, the right-side bracket 236R can be connected to each of the right-side longitudinal member 38R, the right side portion 190R of the rear lower frame member 190, the right-side outer seat frame member 276R and the second lower cross member 42. Since the central seat frame member 278 can be connected to each of the outer seat frame members 276L, 276R, any load input by a passenger occupying one of the seats 22L, 22R can be transmitted to each of the brackets 236L, 236R and distributed to each of the plurality of frame members of the frame assembly 18 referenced above.

The following description is directed toward the left-side bracket 236L with the understanding that the right-side bracket 236R can be a mirror image of the left-side bracket 236L. Referring to FIGS. 6-8, the bracket 236L can include a pair of first side walls 290, 292, a pair of second side walls 294, 296, a pair of connector walls 298, 300, and a central wall 302.

The first side walls 290, 292 can be spaced apart in the transverse direction T of the vehicle 10, and can extend along each of the longitudinal direction L of the vehicle 10 and the vertical direction V of the vehicle 10. Each of the first side walls 290, 292 can have a polygonal shape that includes a top 304, 306 and a base 308, 310. The bases 308, 310 can extend along the longitudinal direction L of the vehicle 10 farther than do the respective tops 304, 306. (See also FIGS. 4 and 5). Referring to FIG. 8, the first side walls 290, 292 can be spaced apart from each other in the transverse direction T of the vehicle 10 by a first distance T1.

Referring to FIGS. 6-8, the top 304 of the outer first side wall 290 can be connected to the left-side outer seat frame member 276L of the left-side passenger seat 22L. The base 308 of the outer first side wall 290 can be connected to the left-side longitudinal member 38L. The outer first side wall 290 can be connected to each of the outer seat frame member 276L and the longitudinal member 38L in any appropriate manner such as but not limited to welding, adhesives, mechanical fasteners, etc.

The second side walls 294, 296 can be spaced apart in the transverse direction T of the vehicle 10, and can extend along each of the longitudinal direction L of the vehicle 10 and the vertical direction V of the vehicle 10. Each of the second side walls 294, 296 can have a polygonal shape that includes a top 312, 314 and a base 316, 318. The bases 316, 318 can extend along the longitudinal direction L of the vehicle 10 farther than do the respective tops 312, 314. (See also FIGS. 4 and 5). Referring to FIG. 8, the second side walls 294, 296 can be spaced apart from each other in the transverse direction T of the vehicle 10 by a second distance T2 that is less than the first distance T1.

Referring to FIGS. 6-8, the second side walls 294, 296 can abut the second lower cross member 42. The top 306 of the inner first side wall 292 can be connected to the left-side outer seat frame member 276L of the left-side passenger seat 22L. The base 310 of the inner first side wall 292 can be connected to the left side portion 190L of the rear lower frame member 190. The inner first side wall 292 can be connected to each of the outer seat frame member 276L and the side portion 190L in any appropriate manner such as but not limited to welding, adhesives, mechanical fasteners, etc.

Each of the connector walls 298, 300 can extend along each of the transverse direction T of the vehicle 10 and the vertical direction V of the vehicle 10. The outer connector wall 298 can be connected to and can extend from each of the first outer side wall 290 and the second outer side wall 294. The inner connector wall 300 can be connected to and extend from each of the first inner side wall 292 and the second inner side wall 296. The tops of the connector walls 298, 300 can be connected to the left-side outer seat frame member 276L of the left-side passenger seat 22L. The bottoms of the connector walls 298, 300 can be spaced away from each of the left-side longitudinal member 38L, the second lower cross member 42 and the left side portion 190L of the rear lower frame member 190.

The central wall 302 can be connected to and extend from each of the second side walls 294, 296. The central wall 302 can extend along the transverse direction T of the vehicle 10. The central member 302 can abut the second lower cross member 42. The central member 302 can be connected to and extend from each of the second lower cross member 42 left-side outer seat frame member 276L. The central member 302 can be connected to each of the second lower cross member 42 left-side outer seat frame member 276L in any appropriate manner such as but not limited to welding, adhesives, mechanical fasteners, etc.

The bracket 236L can further include a pair of flanges 320, 322. The outer flange 320 can be connected to and extend away from first outer side wall 290 along the transverse direction T of the vehicle 10. The inner flange 322 can be connected to and extend away from the first inner side walls 292 in the transverse direction T of the vehicle 10. The flanges 320, 322 can extend away from their respective first side walls 290, 292 in opposite directions. The outer flange 320 can be connected to each of the left-side longitudinal member 38L and the left-side outer seat frame member 276L of the left-side passenger seat 22L in any appropriate manner such as but not limited to welding, adhesives, mechanical fasteners, etc. The inner flange 322 can be connected to each of the left side portion 190L of the rear lower frame member 190 and the left-side outer seat frame member 276L of the left-side passenger seat 22L in any appropriate manner such as but not limited to welding, adhesives, mechanical fasteners, etc.

Thus, each of the brackets 236L, 236R includes a top end and a bottom end that is spaced away from the top end along the vertical direction V of the vehicle 10. Each of the longitudinal members 38L, 38R, the left and right side portions 190L, 190R of the lower frame member 190 and the second cross frame member 42 abuts the bottom end of the respective one of the brackets 236L, 236R. The outer seat frame members 276L, 276R of the passenger seats 22L, 22R abut the top end of the respective one of the brackets 236L, 236R.

Further, the passenger seats 22L, 22R include the outer seat frame members 276L, 276R and the central seat frame member 278. The assembled seat frame member 276L, 276R, 278 can extend in the transverse direction T of the vehicle 10. The assembled seat frame member 276L, 276R, 278 can be connected to each of the brackets 236L, 236R. The assembled seat frame member 276L, 276R, 278 can be spaced away from the second lower cross member 42 along the vertical direction of the vehicle 10.

In the exemplary embodiment of FIGS. 1-14, the brackets 236L, 236R can be stamped from sheet metal to form each of the walls 290, 292, 294, 296, 298, 300, 302 and the flanges 320, 320 such that each of the brackets 236L, 236R is a homogenous single piece. However, alternate embodiments can include brackets 236L, 236R that are molded, forged or machined as a homogenous single piece. Further, alternate embodiments are intended to include or otherwise cover brackets 236L, 236R that are assembled from a plurality of parts that are connected together in any appropriate manner such as but not limited to welding, adhesives, mechanical fasteners, etc. Further still, alternate embodiments can include brackets 236L, 236R that are formed from any appropriate material such as but not limited to metal, fiber reinforced plastic, carbon fibers, etc.

B. Suspension Mounting Structures

Each of the brackets 236L 236R can include a first mounting structure configured to be connected to a first suspension member when the vehicle includes a first configuration of a suspension assembly, and a second mounting structure configured to be connected to a second suspension member when the vehicle includes a second configuration of a suspension assembly. The following description is directed toward the left-side bracket 236L with the understanding that the right-side bracket 236R can be a mirror image go the left-side bracket 236L.

Referring to FIGS. 4-14 collectively, the first mounting structure can include the first side walls 290, 292 and a pair of first mounting holes 324, 326. The first mounting holes 324, 326 can be formed through a respective one of the first side walls 290, 292. The first mounting holes 324, 326 can be aligned to oppose each other such that a connecting member can pass through the first suspension member and each of the first mounting holes 324, 326. As described above, the first side walls 290, 292 can connect the first mounting structure to each of the left-side longitudinal member 38L, the left side portion 190L of the rear lower frame member 190, and the left-side outer seat frame member 276L of the left-side passenger seat 22L.

The second mounting structure can include the second side walls 294, 296 and a pair of second mounting holes 328, 330. The second mounting holes 328, 330 can be formed through a respective one of the second side walls 294, 296. The second mounting holes 328, 330 can be aligned to oppose each other such that a connecting member can pass through the second suspension member and each of the second mounting holes 328, 330. As described above, the second side walls 294, 296 can connect the second mounting structure to each of the second lower cross member 42, and the left-side outer seat frame member 276L of the left-side passenger seat 22L. The second mounting structure can be located between the second lower cross member 42 and the first mounting structure along the longitudinal direction L of the vehicle 10. Since the first side walls are spaced by the first distance T1 that is greater than the second distance T2 by which the second side walls are spaced apart, the first mounting structure can be wider than the second mounting structure along the transverse direction T of the vehicle 10.

V. SUSPENSION AND WHEEL ASSEMBLIES

The vehicle 10 can include a front suspension and wheel assembly and a rear suspension and wheel assembly. As discussed above, the front suspension and wheel assembly can be connected to the front frame assembly 32. At least a portion of the rear suspension and wheel assembly can be mounted to the rear frame assembly 36.

A. Front Suspension and Wheel Assembly

The suspension members of the front suspension and wheel assembly can be configured as a double-wishbone suspension system (also referred to as upper and lower A-arms). However, the disclosed subject matter includes or otherwise covers suspension members that provide a different geometry and/or include multiple links, a strut, or other appropriate members in order to achieve the desired suspension performance so long as at least one of the suspension members is mounted to each side of the front frame assembly 32.

B. Rear Suspension and Wheel Assembly

The rear suspension and wheel assembly can include the rear wheels 16L, 16R and a suspension assembly that connects each of the wheels 16L, 16R. The suspension assembly can connect the wheels 16L, 16R to the frame assembly 18 so that the wheels 16L, 16R can move together relative to the frame assembly 18. An beam axle is an exemplary suspension assembly that can connect the wheels 16L, 16R to each other and to the frame assembly 18. Alternatively, the suspension assembly can independently connect each of the wheels 16L 16R to the frame assembly 18 such that the movement of one of the wheels 16l, 16R does directly affect the other of the wheels 16L, 16R. The first and second configurations described below are exemplary independent suspension assemblies. Although the following discussion is directed to the left side of the rear suspension and wheel assembly, it is to be understood that the right side of the rear suspension and wheel assembly is be a mirror image of the left side.

Figure 9:
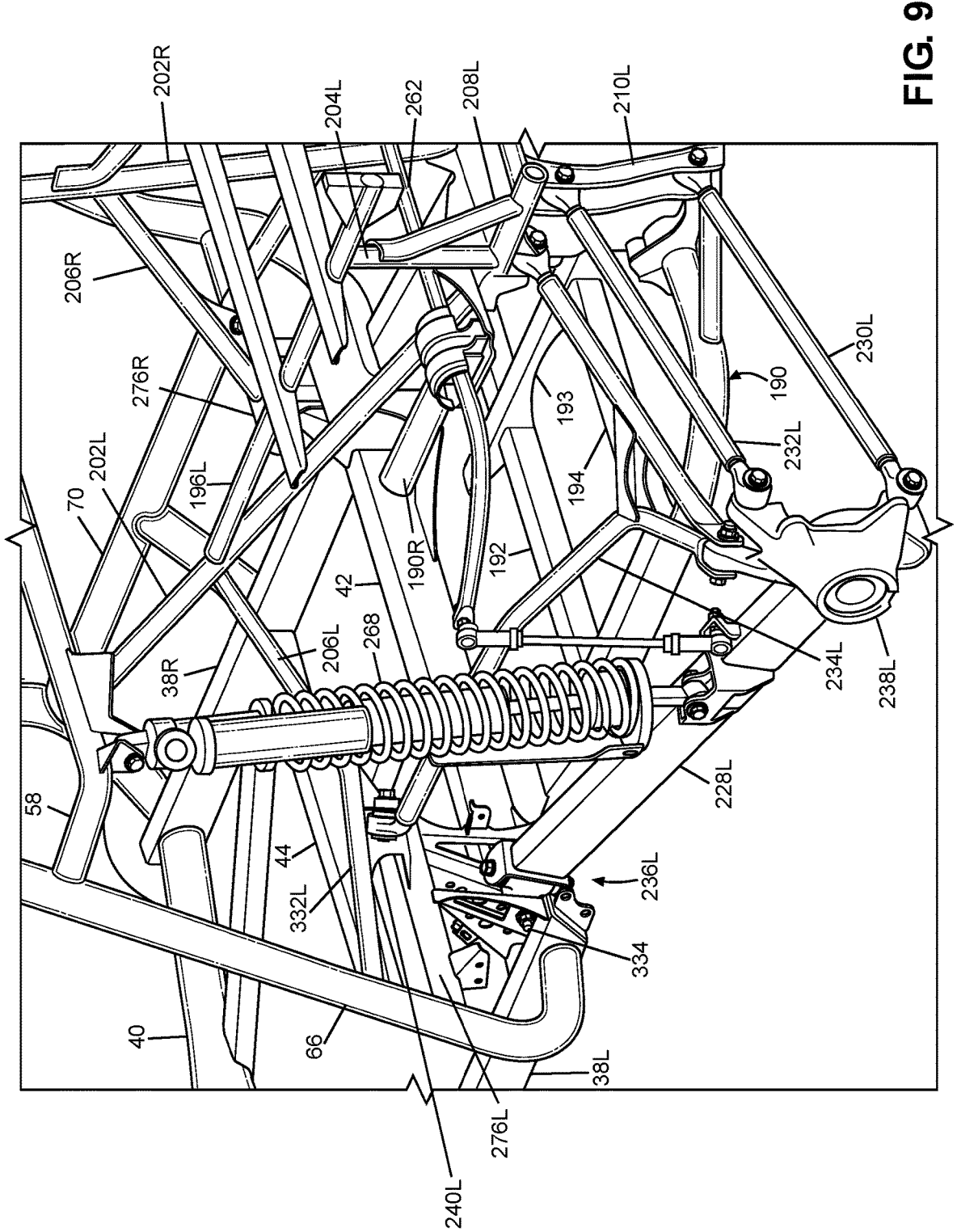
FIG. 9 is a perspective rear view of an enlarged portion of the frame assembly of FIG. 2 and a left-side suspension assembly in accordance with a first embodiment of the left-side suspension assembly.
Figure 10:
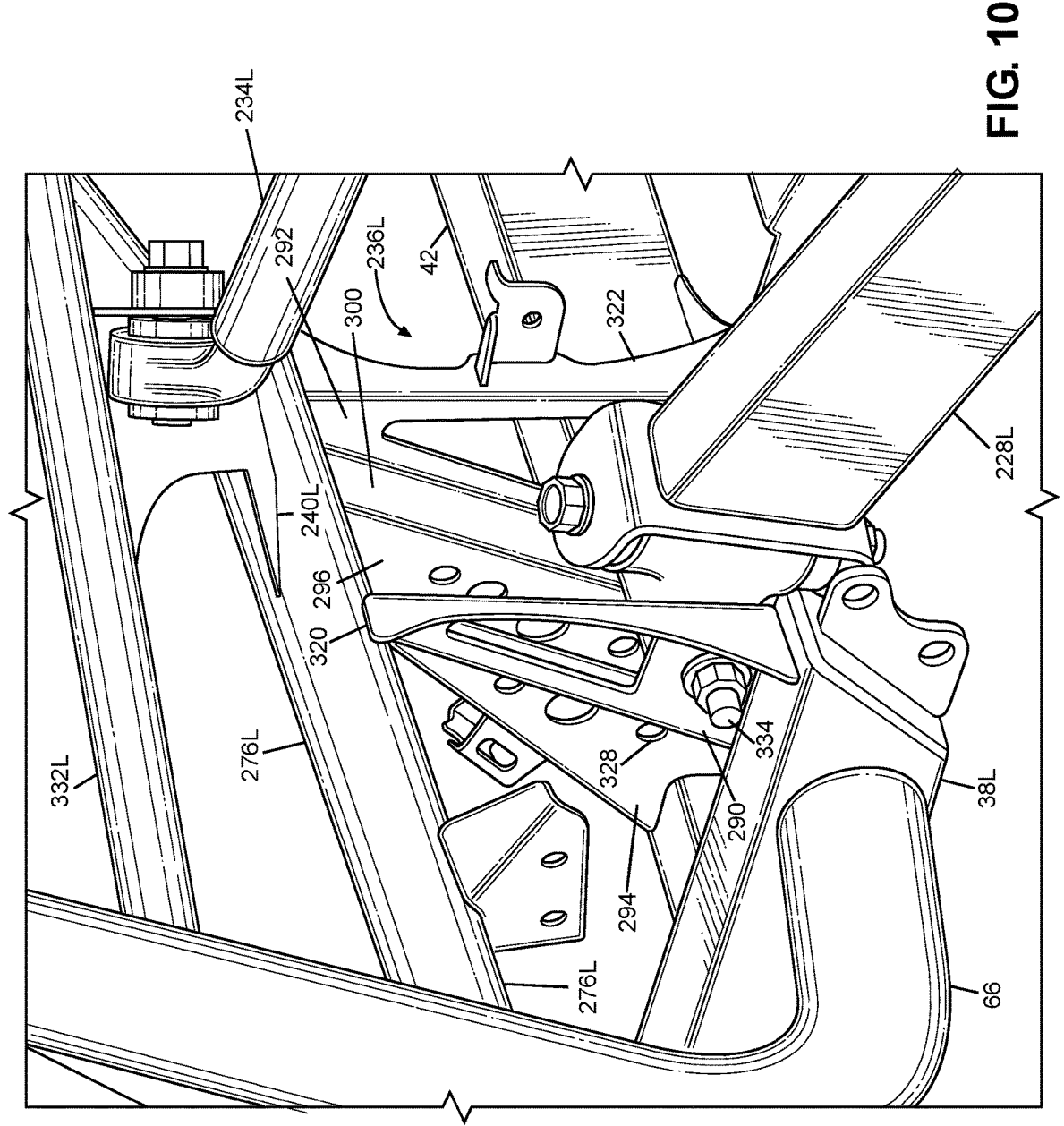
FIG. 10 is an enlarged view of a portion of FIG. 9.
Figure 11:
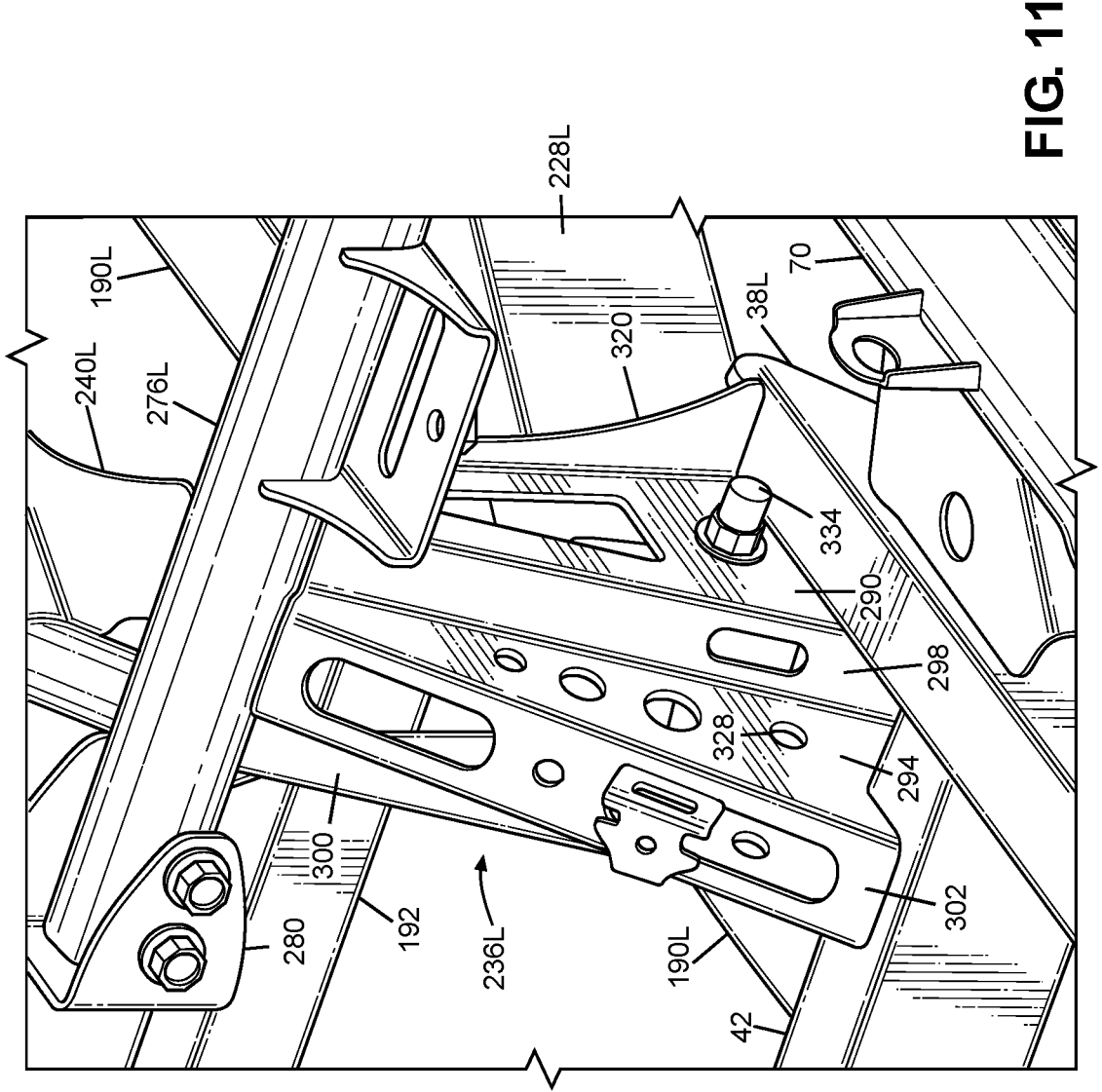
FIG. 11 is a perspective front view of the bracket node, a portion of the frame assembly, and a portion of the frame assembly of FIG. 9.
Figure 12:
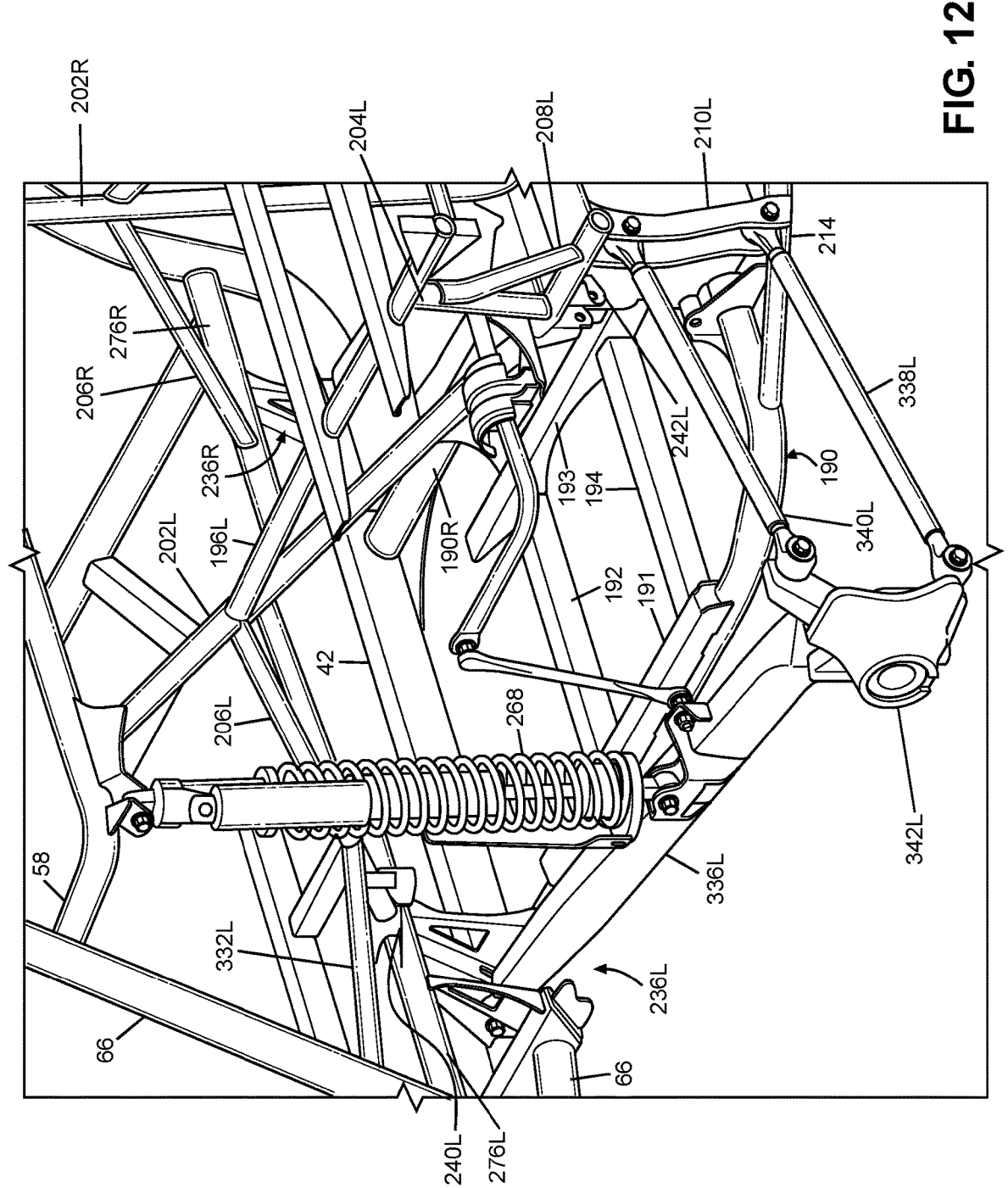
FIG. 12 is a perspective rear view of an enlarged portion of the frame assembly of FIG. 2 and a left-side suspension assembly in accordance with a second embodiment of the left-side suspension assembly.
Figure 13:
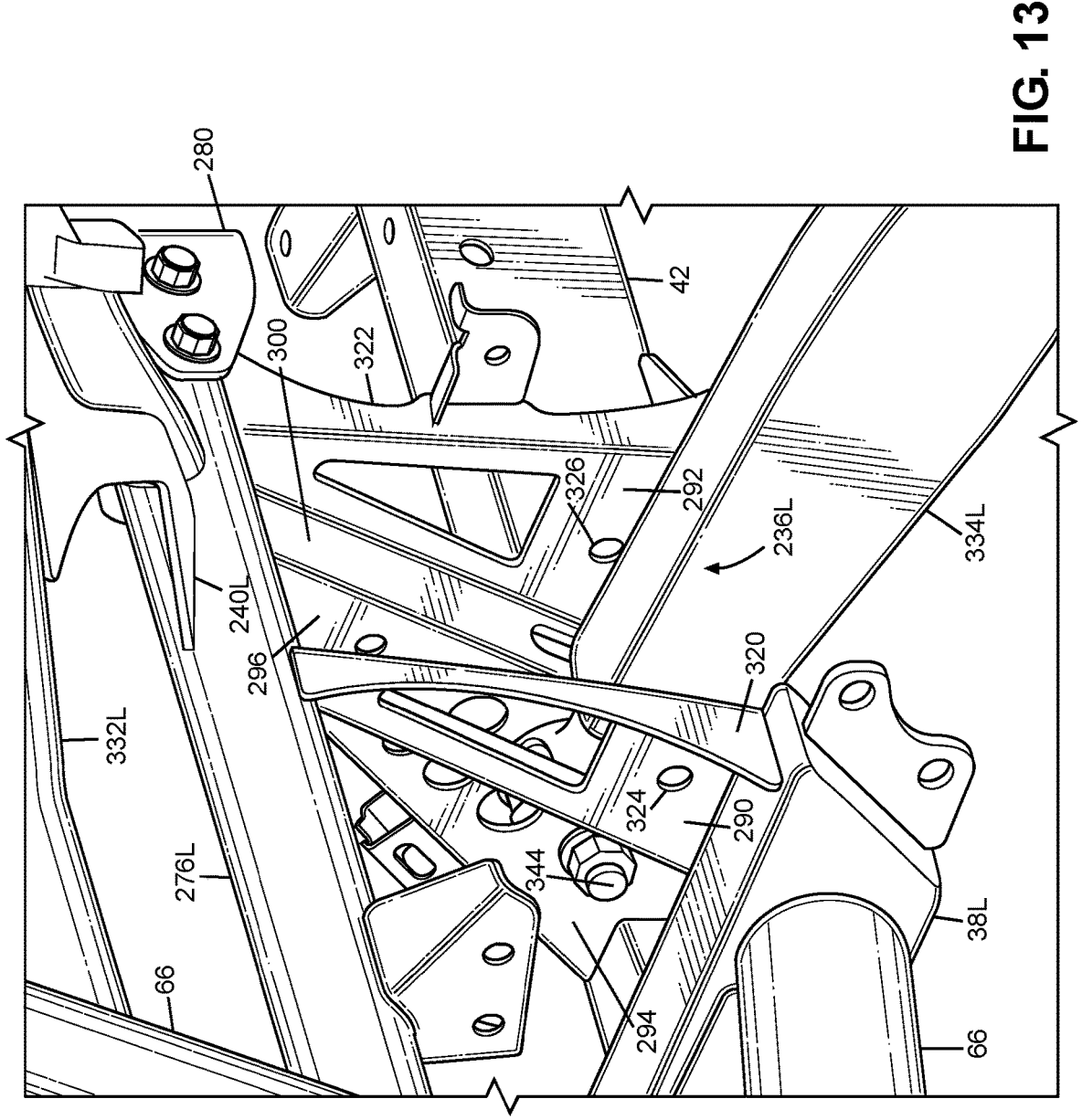
FIG. 13 is an enlarged view of a portion of FIG. 12.
Figure 14:
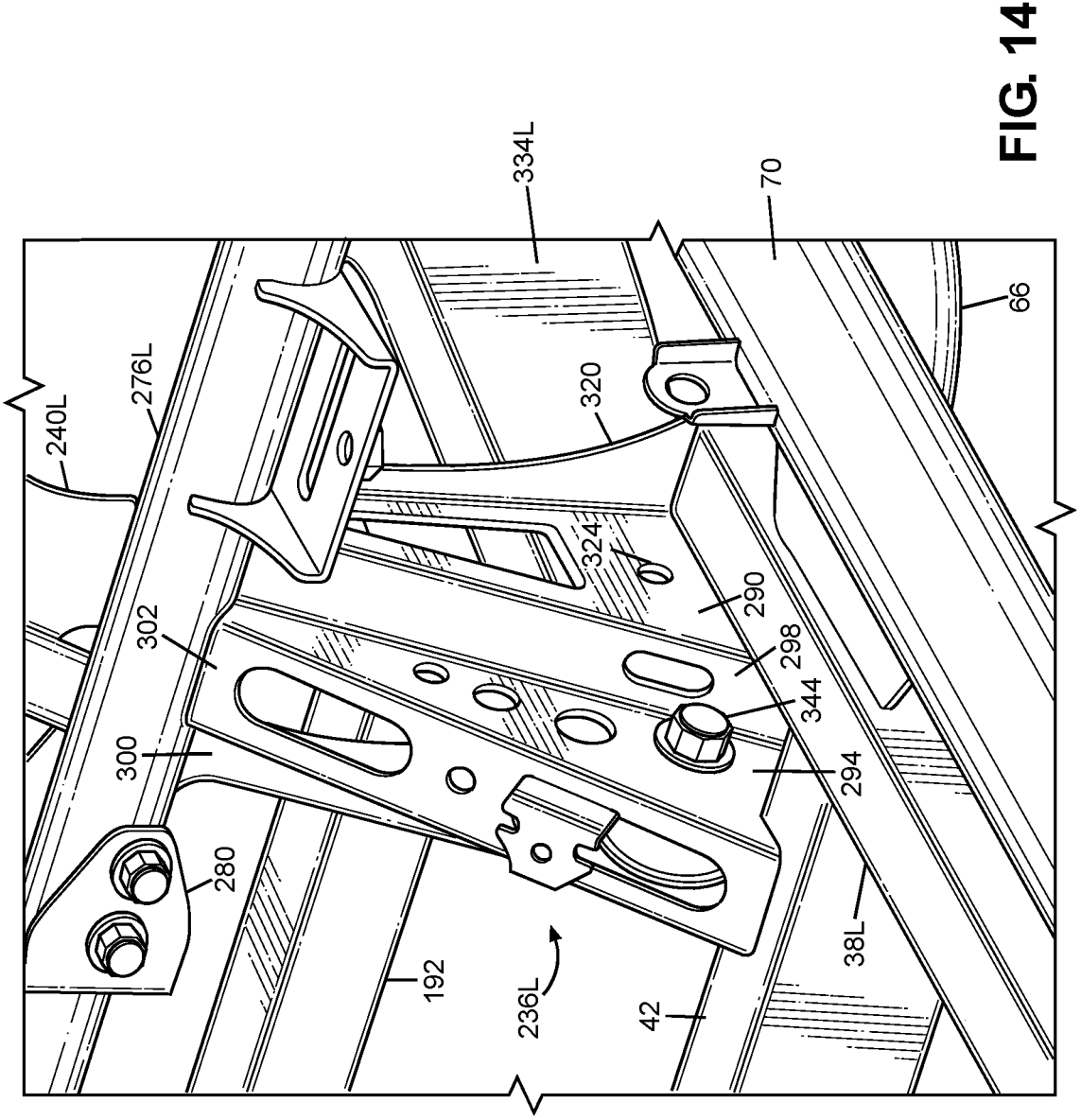
FIG. 14 is a perspective front view of the bracket node, a portion of the frame assembly, and a portion of the frame assembly of FIG. 12.

FIGS. 9-11 illustrate an exemplary embodiment of a first configuration of an independent suspension assembly. Alternatively, the vehicle 10 can include a second configuration of the independent suspension assembly. FIGS. 12-14 illustrate an exemplary embodiment of a second configuration of the independent suspension assembly. The bracket node described above can be utilized with either suspension configuration without adding additional component(s) to or removing component(s) from the frame assembly 18.

1. First Configuration

In the exemplary embodiment of FIGS. 9-11, the left side of the rear suspension and wheel assembly can have a first configuration that includes a first rear suspension member 228L, a second rear suspension member 230L, a third rear suspension member 232L, a fourth rear suspension member 234L and a knuckle 238L.

The first rear suspension member 228L can be referred to as a trailing arm. The first rear suspension member 228L can be configured as a substantially straight link that has a rectangular cross-section and can be hollow or solid. The first rear suspension member 228L can be connected to a rear end portion of the main frame assembly 30 and can be connected to left rear wheel 16L. The first rear suspension member 228L can be connected to the knuckle 238L in any appropriate manner such that the knuckle 238L moves with the first rear suspension member 228L, 228R, and pivots relative to the first rear suspension member 228L. The first rear suspension member 228L can extend from the main frame assembly 30 to the knuckle 238L along the longitudinal direction L of the vehicle 10. The first rear suspension member 228L can be spaced outwardly from the side portions 190L of the rear lower frame member 190.

As discussed above, the left-side bracket 236L can include a pair of first mounting holes 324, 326 and a pair of second mounting holes 328, 330. The first suspension member 228L can be connected to the main frame assembly 30 via the first pair of mounting holes 324, 326 such that the first suspension member 228L can pivot relative to the main frame assembly 30. In the exemplary embodiment of FIGS. 9-11, a mechanical fastener such as but not limited to a first nut and bolt assembly 340 can extend through each of the first mounting holes 324, 326 and the first suspension member 228L.

Thus, the pair of second mounting holes 328, 330 remain unused. Further, the first suspension member 228L can be spaced away from each of the second pair of mounting holes 328, 330 and each of the second side walls 294, 296. Thus, the first suspension member 336L can be spaced away form the second mounting structure.

The second rear suspension member 230L can be referred to as a lateral link or a transverse link. The second rear suspension member 230L can be configured as a substantially straight rod. The second rear suspension member 230L can be hollow or solid. The second rear suspension member 230L can be connected to each of the rear frame assembly 36 and the left rear wheel 16L. For example, the second rear suspension member 230L can be connected to the rear connecting frame member 210L in any appropriate manner that permits the second suspension member 230L to pivot relative to the rear connecting frame member 210L. The second rear suspension member 230L can be connected to the knuckle 238L in any appropriate manner such that the knuckle 238L moves with the second rear suspension member 230L and pivots relative to the respective one of the second rear suspension member 230L. The second rear suspension member 230L can extend along the transverse direction T of the vehicle 10.

The third rear suspension member 232L can be referred to as a lateral link or a transverse link. The third rear suspension member 232L can be configured as a substantially straight rod and can be hollow or solid. The third rear suspension member 232L can be connected to each of the rear frame assembly 36 and the left rear wheel 16L. For example, each of the third rear suspension member 232L can be connected to the rear connecting frame member 210L in any appropriate manner that permits the third rear suspension member 232L to pivot relative to the rear connecting frame member 210. The third rear suspension member 232L can be connected to the knuckle 238L in any appropriate manner such that the knuckle 238L moves with the third rear suspension member 232L, and pivots relative to the third rear suspension member 232L. The third rear suspension member 232L can extend along the transverse direction T of the vehicle 10. The third rear suspension member 232L can be spaced away from and above the second rear suspension member 230L in the vertical direction V of the vehicle 10. The third rear suspension member 232L can extend substantially parallel to the second rear suspension member 230L.

The fourth suspension member 234L can be referred to as an upper A-arm, or an upper wishbone. The fourth suspension member 234L can be connected to each of the main frame assembly 30, the rear frame assembly 36 and the knuckle 238L. The fourth suspension member 234L can be connected to left the rear wheel 16L.

For example, the main frame assembly 30 can include a pair of first suspension brackets mounted above the brackets 236L, 236R. Referring to FIGS. 2 and 3, for example, the rear frame assembly 36 can include a pair of connecting frame members 332L, 332R that extend from and are connected to each of a respective one of the third cage side members 36 and a respective one of the third rear frame members 206L, 206R. Each of the second suspension brackets can be mounted on a respective one of the connecting frame members 332L, 332R.

FIG. 9-11 show an exemplary second suspension bracket 240L mounted on the left side of the main frame assembly 30 above the left-side bracket 236L. A mirror image of the left-side second suspension bracket 240L can be mounted on the right-side connecting frame member 332R above the right-side bracket 236R.

Referring to FIGS. 2 and 3 the rear frame assembly 36 can include a pair of third suspension bracket 242L, 242R. Referring to FIG. 9, a first end of each of the fourth rear suspension member 234L can be connected to the second suspension bracket 240L in any appropriate manner such that the fourth rear suspension member 234L can pivot relative to the main frame assembly 30. A second end of the fourth rear suspension member 234L can be connected to the left-side third suspension bracket 242L in any appropriate manner such that the fourth rear suspension member 234L can pivot relative to the rear frame assembly 36. A third end of the fourth rear suspension member 234L can be connected to the knuckle 238L in any appropriate manner such that the knuckle 238L moves with the fourth rear suspension members 234L, and pivots relative to the fourth rear suspension member 234L.

2. Second Configuration

In the exemplary embodiment of FIGS. 12-14, the left side of the rear suspension and wheel assembly can have a second configuration that includes a first rear suspension member 336L, a second rear suspension member 338L, a third rear suspension member 340L and a knuckle 342L.

The first rear suspension member 336L can be referred to as a trailing arm. The first rear suspension member 336L can be configured as a substantially straight link that has a rectangular cross-section and can be hollow or solid. The first rear suspension member 336L can be connected to a rear end portion of the main frame assembly 30 and can be connected to left rear wheel 16L. The first rear suspension member 336L can be connected to the knuckle 342L in any appropriate manner such that the knuckle 342L moves with the first rear suspension member 336L, and pivots relative to the first rear suspension member 336L. The first rear suspension member 336L can extend from the main frame assembly 30 to the knuckle 342L along the longitudinal direction L of the vehicle 10. The first rear suspension member 336L can be spaced outwardly from the side portions 190L of the rear lower frame member 190.

As discussed above, the left-side bracket 236L can include a pair of first mounting holes 324, 326 and a pair of second mounting holes 328, 330. The first suspension member 336L can be connected to the main frame assembly 30 via the second pair of mounting holes 328, 330 such that the first suspension member 336L can pivot relative to the main frame assembly 30. In the exemplary embodiment of FIGS. 12-14, a mechanical fastener such as but not limited to a second nut and bolt assembly 344 can extend through each of the second mounting holes 328, 330 and the first suspension member 336L.

The second and third suspension brackets 240L, 242L remain unused in the second configuration of the rear suspension assembly of FIGS. 12-14.

Thus, the pair of first mounting holes 324, 326 remain unused and both configurations of the rear suspension and wheel assembly can be connected to the frame assembly 18 without adding or removing one or more components of the frame assembly 18. Further, the first suspension member 336L can be spaced away from each of the first pair of mounting holes 324, 326 and each of the first side walls 290, 292. Thus, the first suspension member 336L can be spaced away form the first mounting structure.

The second and third suspension members 338L, 340L can be identical to the respective one of the second and third suspension members 2230L, 232L of the first configuration of the rear suspension and wheel assembly. However, alternate embodiments can include the second and third suspension members 338L, 340L configured with different dimensions and/or structure(s) as compared to the second and third suspension members 230L, 232L of the first configuration, depending on the suspension geometry and performance desired for the second configuration of the rear suspension and wheel assembly. Further, the second and third suspension members 338L, 340L can be connected to the rear frame assembly 36 as described above with respect to the second and third suspension members 230L, 232L.

3. Components Common to the Two Configurations

Both configurations of the rear suspension and wheel assembly can further include a stabilizer bar 262. The stabilizer bar 262 can be mounted to the rear frame assembly 36 and can be connected to each of the first rear suspension members, directly or indirectly. The stabilizer bar 262 (also referred to as an anti-roll bar, or an anti-sway bar) can be a relatively rigid member that is configured to resist a torsional input caused by body roll while also being compliant to a torsional input caused by the displacement of one or both of the rear wheels 16L, 16R as the vehicle 10 travels along uneven terrain. For example, if the left-side first rear suspension member 228L moves in a direction that is opposite to the direction in which the right-side first rear suspension member moves, then a torsional load is input to the stabilizer bar 262. The stabilizer bar 262 can be tuned to absorb or resist this torsional input such that the relatively opposite movements of the left-side and right-side first rear suspensions members 228L, 228R can be reduced or resisted, thereby reducing or resisting an amount of body roll during cornering.

Referring to FIGS. 9-14, the rear suspension and wheel assembly can further include a pair of spring and damper assemblies 268. The spring and damper assemblies can be configured to lessen loads and energy input to the frame assembly 18 by the rear wheels 16L, 16R. A first end of each of the spring and damper assemblies 268 can be connected to the main frame assembly 30 and second end of each of the spring and damper assemblies 268 can be connected to a respective one of the first rear suspension members 228L, 228R.

Thus, the frame assembly 18 can accommodate two different configurations of the rear suspension and wheel assembly without the need to add or remove one or more components of the frame assembly 18. Further, each of the two configurations can share one or more common parts or components. Thus, the number parts unique parts needed to supply the two configurations can be kept low. Further, still the brackets 236L, 236R can connect a plurality of members of the frame assembly 18 to each. That is, the brackets 236L, 236L can distribute loads and kinetic energy input by the rear suspension and wheel assembly to a plurality of frame members without a requirement for intervening structure. Further, the brackets 236L, 236R can distribute loads and kinetic energy input by either one of two different rear suspension and wheel configurations without requiring the removal of structure from or the addition of structure to the frame assembly 18.

VI. ALTERNATIVE EMBODIMENTS

While certain embodiments of the invention are described above, and FIGS. 1-9 disclose a best mode for practicing the various inventive aspects, it should be understood that the invention can be embodied and configured in many different ways without departing from the spirit and scope of the invention.

For example, embodiments are disclosed above in the context of a vehicle 10 shown in FIG. 1. However, embodiments are intended to include or otherwise cover any type of vehicle disclosed above. For example, exemplary embodiments are intended to include or otherwise cover any type of vehicle that can travel on an improved surface such as but not limited to a paved road.

Exemplary embodiments are intended to include or otherwise cover any type of bracket node. In other words, exemplary embodiments are intended to cover any application of bracket node that can sustain load or kinetic energy inputs from a rear suspension and wheel assembly and from a passenger. For example, the brackets 236L, 236R can be made from a plurality of parts or made as a unitary homogenous component. Further, instead of using a stamped metal sheet, the bracket can be cast or forged or hydroformed from metal, or molded using plastic, carbon fiber, fiberglass, etc., or any combination of materials.

Alternate embodiments can include a seat frame 274 that can permit the seat back 272 to pivot relative to the seat bottom 270. Alternative embodiments can include a seat frame 274 that immovably fixes the seat back 270 relative to the seat bottom. Further, alternative embodiments can omit the slide assembly 282 the seat frame 274 that immovably fixes the seat bottom 270 and the seat back 272 relative to the frame assembly 18.

Alternate embodiments can include a back frame 280 that is formed separately from a bottom frame 278. Further, exemplary embodiments can include a seat bottom 278 that is connected to the bracket separately from the seat back 280 such that the seat bottom 278 is connected directly to the bracket node and the seat back is connected bracket node by one or more intervening structure(s).

Exemplary embodiments are intended to include any appropriate shape for each of the front, main and rear frame members, including different cross-sectional shapes, hollow or solid shapes, etc.

Alternate embodiments can include a seat frame 274 that includes more than one frame structure that forms each of the front frame member, the bottom frame member and the back frame member.

Exemplary embodiments are intended to include or otherwise cover any type of rear suspension and wheel assembly. For example, embodiments are disclosed in the context of a first rear suspension member that has a unique geometry compared to each of the second, third and fourth rear suspension members, and a fourth suspension member that has a unique geometry as compared to each of the second and third suspension members. Exemplary embodiments are intended to include other types of suspension members such as but not limited to an upper suspension member and a lower suspension member that are configured as A-arms (also referred to as wishbones). Exemplary embodiments are also intended to include an upper suspension member that has the same geometry compared to the lower suspension member.

Embodiments are disclosed above in the context of vehicle 10 shown in FIG. 1 having a front frame assembly that includes a front bumper assembly. However, embodiments are intended to include or otherwise cover vehicles that include a rear bumper assembly connected to the rear end of the rear frame assembly.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A bracket node assembly for an off-road vehicle configured with a side-by-side seating arrangement, the vehicle including at least one suspension member that supports a respective wheel of the vehicle, the bracket node assembly comprising:
   a first frame member extending along a longitudinal direction of the vehicle;
   a second frame member extending along a longitudinal direction of the vehicle;
   a cross member extending in a transverse direction of the vehicle;
   a passenger seat; and
   a bracket configured to be connected to the suspension member, and the bracket is connected to each of the first frame member, the second frame member, the cross member, and the passenger seat.

2. The bracket node assembly according to claim 1, wherein the bracket includes:
   a pair of first side walls spaced apart in the transverse direction of the vehicle, and extending along each of the longitudinal direction of the vehicle and along a vertical direction of the vehicle;
   a pair of second side walls spaced apart in the transverse direction of the vehicle, and extending along each of the longitudinal direction of the vehicle and along a vertical direction of the vehicle;
   a pair of connector walls, each of the connector walls is connected to and extends from a respective one of the first walls and a respective one of the second walls, and each of the connector walls extends along each of the transverse direction of the vehicle and the vertical direction of the vehicle; and
   a central wall connected to and extending from each of the second side walls, the central wall extends along the transverse direction of the vehicle.

3. The bracket node assembly according to claim 2, wherein the bracket includes:
   a pair of first mounting holes, each of the first mounting holes extends through a respective one of the first sides such that first mounting holes oppose one anther another,
   a pair of second mounting holes, each of the second mounting holes extends through a respective one of the second sides such that second mounting holes oppose one anther another, and
   the suspension member is connected to the first mounting holes or the suspension member is connected to the second mountings holes.

4. The bracket node assembly according to claim 2, wherein
   the bracket further includes a pair of flanges, a first one of the flanges is connected to and extends away from a first one of the first side walls, and a second one of the flanges is connected to and extends away from a second one of the first side walls,
   the first one of the flanges and the first one of the first side walls are connected to the first frame member, and the second one of the flanges and the second one of the first side walls are connected to the second frame member.

5. The bracket node assembly according to claim 2, wherein the central wall and each of the second side walls abuts the cross member.

6. The bracket node assembly according to claim 2, wherein each of the first side walls has a polygonal shape that includes a base and a top, the base extends along the longitudinal direction of the vehicle farther than the top extends.

7. The bracket node assembly according to claim 2, wherein each of the second side walls has a polygonal shape that includes a base and a top, the base extends along the longitudinal direction of the vehicle farther than the top extends.

8. The bracket node assembly according to claim 2, wherein
the first side walls are spaced apart in the transverse direction of the vehicle by a first distance, and
the second side walls are spaced apart in the transverse direction of the vehicle by a second distance that is less than the first distance.

9. The bracket node assembly according to claim 2, wherein
the bracket further includes a pair of flanges, each of the flanges is connected to and extends away from a respective one of the first side walls, and each of the flanges and the first side walls is connected to the passenger seat.

10. The bracket node assembly according to claim 1, wherein the bracket includes:
a first mounting structure configured to be connected to the suspension member when the vehicle includes a first configuration of a suspension assembly, and
a second mounting structure configured to be connected to the suspension member when the vehicle includes a second configuration of a suspension assembly, and the second mounting structure is located between the cross member and the first mounting structure along the longitudinal direction of the vehicle.

11. The bracket node assembly according to claim 1, wherein the bracket includes:
a first mounting structure configured to be connected to the suspension member and the suspension member is spaced away from the second mounting structure when the vehicle includes a first configuration of a suspension assembly, and
a second mounting structure configured to be connected to the suspension member and the suspension member is spaced away from the first mounting structure when the vehicle includes a second configuration of the suspension assembly.

12. The bracket node assembly according to claim 11, wherein the first mounting structure is wider along the transverse direction of the vehicle than is the second mounting structure.

13. The bracket node assembly according to claim 11, wherein
the first mounting structure is connected to each of the first frame member, the second frame member, and the passenger seat; and
the second mounting structure is connected to each of the cross member and the passenger seat.

14. The bracket node assembly according to claim 1, wherein
bracket includes a top end and a bottom end spaced away from the top end in a vertical direction of the vehicle,
each of the first frame member, the second frame member, and the cross member abuts the bottom end of the bracket, and
the passenger seat abuts the top end of the bracket.

* * * * *